(12) United States Patent
Fukui et al.

(10) Patent No.: US 7,767,753 B2
(45) Date of Patent: Aug. 3, 2010

(54) BINDER RESIN COMPOSITION, PASTE AND GREEN SHEET

(75) Inventors: Hiroji Fukui, Osaka (JP); Yasuyuki Ieda, Osaka (JP); Tetsunari Iwade, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 309 days.

(21) Appl. No.: 11/629,884

(22) PCT Filed: Jun. 21, 2005

(86) PCT No.: PCT/JP2005/011360

§ 371 (c)(1),
(2), (4) Date: Dec. 18, 2006

(87) PCT Pub. No.: WO2005/123830

PCT Pub. Date: Dec. 29, 2005

(65) Prior Publication Data

US 2007/0249770 A1    Oct. 25, 2007

(30) Foreign Application Priority Data

| Jun. 21, 2004 | (JP) | ............................. | 2004-182397 |
| Jul. 30, 2004 | (JP) | ............................. | 2004-223973 |
| Nov. 26, 2004 | (JP) | ............................. | 2004-343106 |
| Dec. 2, 2004 | (JP) | ............................. | 2004-350117 |
| Mar. 8, 2005 | (JP) | ............................. | 2005-064459 |
| Mar. 10, 2005 | (JP) | ............................. | 2005-067876 |
| Mar. 23, 2005 | (JP) | ............................. | 2005-085000 |

(51) Int. Cl.
*C08L 29/04* (2006.01)
*C08L 33/06* (2006.01)
*C08F 220/18* (2006.01)
*C03C 1/00* (2006.01)

(52) U.S. Cl. .................... 524/560; 524/394; 524/833

(58) Field of Classification Search .......... 524/394, 524/833, 401, 413, 430, 431, 560, 81; 526/328.5; 65/100; 264/212, 140, 650
See application file for complete search history.

(56) References Cited

U.S. PATENT DOCUMENTS

| 4,464,420 | A | * | 8/1984 | Taguchi et al. ............ 427/97.4 |
| 4,978,777 | A | | 12/1990 | Takagawa et al. |
| 5,292,693 | A | * | 3/1994 | Kaga et al. .................. 501/103 |
| 5,660,781 | A | * | 8/1997 | Moriya et al. ............... 264/212 |
| 5,871,840 | A | * | 2/1999 | Asada et al. ................. 428/328 |
| 5,925,444 | A | * | 7/1999 | Katsumura et al. .......... 428/209 |
| 6,147,573 | A | * | 11/2000 | Kumagai et al. ............ 333/185 |
| 6,790,907 | B2 | * | 9/2004 | Takata et al. ................ 524/833 |
| 2004/0028592 | A1 | * | 2/2004 | Akimoto et al. ............ 423/263 |

FOREIGN PATENT DOCUMENTS

| JP | 58-150248 A | 9/1983 |
| JP | 60-122770 A | 7/1985 |
| JP | 60-170611 A | 9/1985 |
| JP | 01-098654 A | 4/1989 |
| JP | 5-9232 A | 1/1993 |
| JP | 05-132692 A | 5/1993 |
| JP | 05-157035 A | 6/1993 |
| JP | 05-182592 A | 7/1993 |
| JP | 05-194548 A | 8/1993 |
| JP | 05-194551 A | 8/1993 |
| JP | 05-208640 A | 8/1993 |
| JP | 06-048912 A | 2/1994 |
| JP | 07-316456 A | 12/1995 |
| JP | 09-132692 A | 5/1997 |
| JP | 09-142941 A | 6/1997 |
| JP | 9-175869 A | 7/1997 |
| JP | 09-194548 A | 7/1997 |
| JP | 09-194551 A | 7/1997 |
| JP | 09-208640 A | 8/1997 |
| JP | 09-315719 A | 12/1997 |
| JP | 10-171119 A | 6/1998 |
| JP | 11-316456 A | 11/1999 |
| JP | 2000-011865 A | 1/2000 |
| JP | 2000-063181 A | 2/2000 |
| JP | 2000-290314 A | 10/2000 |
| JP | 2001-049070 A | 2/2001 |
| JP | 2002-133946 A | 5/2002 |
| JP | 2002-145969 A | 5/2002 |
| JP | 2002-275202 A | 9/2002 |
| JP | 2003-268053 A | 9/2003 |
| JP | 2003-287883 A | 10/2003 |
| JP | 2003-288813 A | 10/2003 |
| JP | 2004-014297 A | 1/2004 |
| JP | 2004-051444 A | 2/2004 |
| JP | 2004-059358 A | 2/2004 |
| JP | 2004-083842 A | 3/2004 |
| JP | 2004-142964 A | 5/2004 |
| JP | 2004-260130 A | 9/2004 |
| JP | 2004-315719 A | 11/2004 |

OTHER PUBLICATIONS

"Freezing Points Graph of Glycerine-Water Solutions", http://www.dow.com/glycerine/resources/freezept.htm, Dow Chemical Company, Oct. 5, 2008.*
Machine Translation of JP 2000-064181.*
Lewis, Richard J., Sr. "Room Temperature" from Hawley's Condensed Chemical Dictionary (14th Edition). John Wiley & Sons, 2002.*
International Search Report dated Oct. 18, 2005.
Notification of Reasons for Refusal for the Application No. 2005-180710 from Japan Patent Office mailed Jan. 26, 2010.

* cited by examiner

*Primary Examiner*—Vasu Jagannathan
*Assistant Examiner*—Hannah Pak
(74) *Attorney, Agent, or Firm*—Cheng Law Group, PLLC

(57) ABSTRACT

A binder resin composition which shows no "stringing" when used in printing and can disappear without leaving any residue upon burning at a relatively low temperature; a glass paste; and a ceramic paste. The binder composition contains as a matrix resin, a copolymer (A) comprising a segment derived from an alkyl(meth)acrylate monomer and a polyalkylene oxide segment composed of repeating units represented by the following chemical formula (1), —(OR)n— wherein R is $C_3$ or higher alkylene and n is an integer.

18 Claims, 3 Drawing Sheets

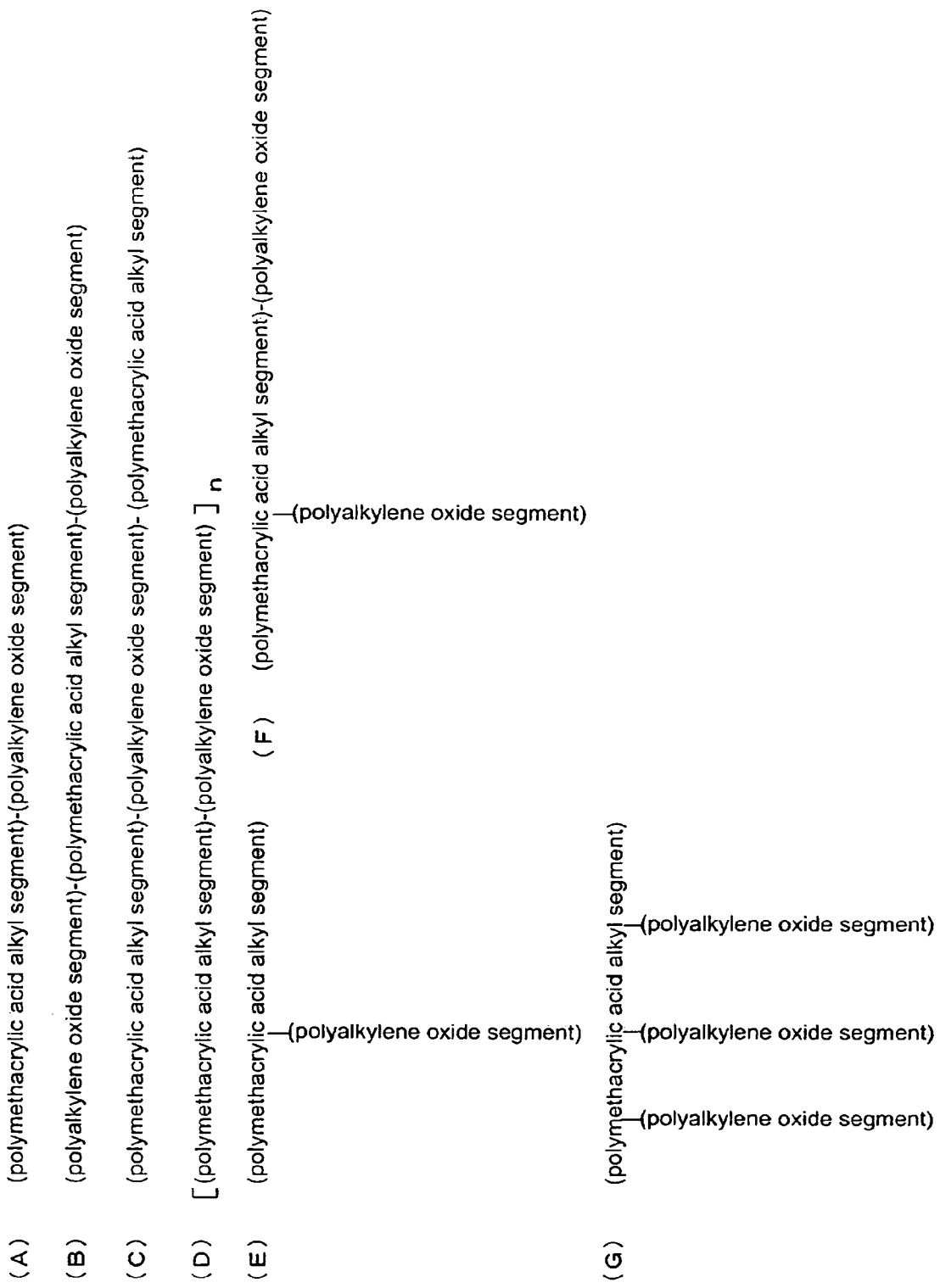
[FIG. 1]

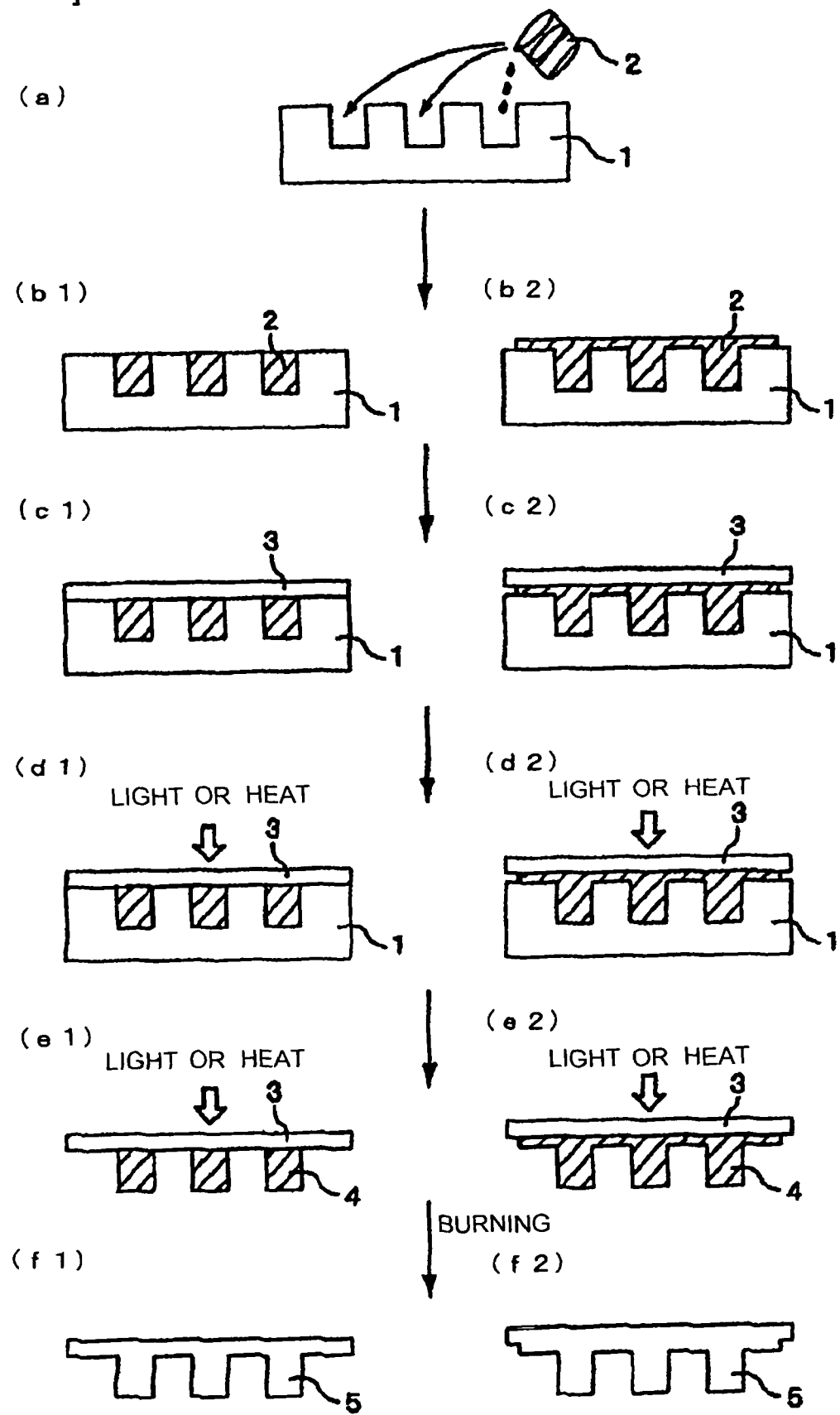
[FIG. 2]

[FIG. 3]

(A) (acrylic polymer chain)-(polyoxyalkylene chain)

(B) (polyoxyalkylene chain)-(acrylic polymer chain)-(polyoxyalkylene chain)

(C) (acrylic polymer chain)-(polyoxyalkylene chain)-(acrylic polymer chain)

(D) [ (acrylic polymer chain)-(polyoxyalkylene chain) ] $_n$ (E) (acrylic polymer chain)
    |
    (polyoxyalkylene chain)

(F) (acrylic polymer chain)
    |
    (polyoxyalkylene chain)

(G) (acrylic polymer chain)
    |         |         |
    (polyoxyalkylene chain)  (polyoxyalkylene chain)  (polyoxyalkylene chain)

BINDER RESIN COMPOSITION, PASTE AND GREEN SHEET

TECHNICAL FIELD

The present invention relates to a binder resin composition, a paste and a green sheet capable of disappearing without leaving any residue upon burning at a relatively low temperature.

BACKGROUND ART

In recently years, a technique is practiced that involves molding a paste containing inorganic powder such as ceramic powder or glass powder dispersed in a binder resin composition, followed by burning to produce a fine molded product.

For example, a multilayer capacitor is generally produced through the following steps. First, after adding a plasticizer, a dispersing agent or the like to a solution of a binder resin dissolved in an organic solvent, ceramic material powder is added, and then the solution is homogenously mixed by a three-roll mill, beads mill, ball mill and the like mixing device. The resultant mixture is then defoamed to obtain a ceramic slurry composition in the form of a paste having a specific viscosity. The obtained slurry composition is then formed into a sheet form by making it flow and extend on a supporting surface of a polyethylene terephthalate film processed for mold release or of a stainless plate with the use of a coater such as doctor blade or reverse roll coater. After distilling off volatile solvents and the like, e.g., by heating, the molded product is released from the supporting member to obtain a ceramic green sheet.

Then on this ceramic green sheet, a conductive paste which is to form an internal electrode is applied by, for example, screen printing. A plurality of such ceramic green sheets on which the conductive paste is applied are alternately stacked and bonded by thermal compression to give a laminate. The conductive paste used in this case is mainly composed of a metal material such as palladium or nickel constituting an electrode, an organic solvent having compatibility to the surface of ceramic green sheet, and a binder resin such as ethyl cellulose.

Then after conducting a process of thermo-decomposing a binder component or the like contained in the laminate as a constituent of ceramic green sheet and conductive paste under heat and removing the same (so-called degreasing process), a ceramic burnt product is obtained by burning. Through a process of sintering an external electrode on an end face of the ceramic burnt product, a laminate ceramic capacitor is obtained.

For example, a plasma display (hereinafter, also referred to as PDP) has a basic structure made up of a pair of glass substrates which constitute a panel main body, a fluorescent layer, filler gas based on neon and/or xenon, a dielectric layer, a partition and an electrode. The electrode may be formed of a material such as Ag paste or Cu—Al alloy. The electrode may be obtained, for example, patterning after forming a metal film on a glass substrate by thick film printing or vapor deposition. There are known two types of PDPs: AC type which is driven by AC voltage or pulse voltage, and DC type which is driven by DC voltage. In an AC type PDP, an electrode is covered with a dielectric layer, and in a DC type PDP, an electrode is disposed to a discharge space. Also employed is a method in which a dielectric layer is formed by burning a binder resin composition in which low melting point glass is dispersed.

Further, in the DC type PDP, it is necessary to use a glass substrate having a partition. Conventionally, as a method of producing a glass substrate having a partition, a method in which a partition is formed by forming a pattern on a glass substrate with a paste of ceramic powder mixed with an organic binder, a solvent and the like by a thick film printing, followed by drying and burning (so-called thick film printing method, see Patent document 1, for example); and a method in which a partition is formed by printing a paste obtainable by mixing ceramic powder with an organic binder, solvent and the like, on a glass substrate in a flat manner at a predetermined film thickness, and forming a pattern by dry etching by a sand blast method while masking a part where a pattern is to be formed with photo resist, removing the resist, and forming a partition by burning (so-called sand blast method, see Patent document 2, for example).

In the thick film printing method, however, the thickness that is obtainable by a single printing operation is as large as about dozen micrometers, and the printing operation should be repeated about ten times in order to achieve the height of not less than 100 μm which is required for a partition. This raised the problem of poor productivity due to difficulty in positional registration of superposing printing and disability of obtaining height accuracy. Also in the sand blast method, since photo resist is used, the process is complicated because of necessity of exposure, development, removal of resist and the like steps, and it is difficult to form a partition with high accuracy because the lateral face of the partition is etched to be smaller than the width of the mask, or the bottom of the partition is widened.

For addressing this, a light-transmissive substrate having a certain pattern of a light shielding material formed on the surface, and a photoconductive material layer formed thereon is exposed to light from back side of the substrate, and developed after the light exposure. Next, using a model for a partition transfer intaglio having an appropriate pattern of projections on a substrate, an intaglio for transferring a partition is prepared, and then the recesses of the transferring intaglio are filled with a partition material to realize transferring to the substrate for a plasma display panel. A method of forming a partition of a plasma display panel including these steps is disclosed in Patent document 3. In this method, a resin containing glass powder is flown into a model in which a desired pattern of recesses are formed, a substrate is overlaid thereon, and then the model is removed by inversion to form projections formed of the resin containing glass powder on the substrate, by burning this, the glass component and the substrate are integrated to provide a partition (so-called transfer method). According to the transfer method, it is possible to provide a glass substrate having a partition more easily and conveniently than the sand blast method and the thick film printing method.

As a binder resin composition used for applications such as production of laminate ceramic capacitor, PDP and the like, for example, those based on ethyl cellulose, methyl cellulose, polyvinyl butyral, polyvinyl alcohol, polyethylene glycol and the like are considered and used. However, such binder resin compositions based on these resins have high thermal decomposition temperature, and when they are used for sintering low-melting temperature glass which is often used in PDP, for example, there arises the problem that decomposition residue of the binder resin is left in the sintered product.

For addressing this, a binder resin composition of low-temperature sintering type based on acrylic resin is examined. Patent document 4 discloses a methacrylic resin containing methacrylic acid alkyl ester component having a weight-average molecular weight of more than 200,000 and a glass transition temperature of −20 to 60° C. This methacrylic resin has low thermal decomposition temperature and is likely to be degreased during burning. Further, when a mixture containing ceramic powder is formed into a tape-like ceramic green sheet, excellent tape strength is achieved. However, the large molecular weight will cause so-called "stringiness" which is the phenomenon that the paste hangs from the printing plate like a string when it is used as a conductive paste and printed by screen printing.

Patent document 5 discloses a ceramic green sheet using an acrylic resin having an average molecular weight of 200,000 or more, an acid number of 2.4 to 7.2, and a glass transition temperature of 50 to 90° C. However, such acrylic resin sometimes causes "stringiness" when it is applied as a conductive paste and subjected to printing by screen printing or the like.

Patent document 6 discloses an acrylic resin composition containing as a binder component, an acrylic acid resin which comprises alkyl(meth)acrylate, unsaturated carboxylic acid, hydroxyl group-containing (meth)acrylate, and other copolymerizing monomers. This acrylic resin composition little causes "stringiness" because it causes the phenomenon called "stringiness cut" in which the paste does not hang from the printing plate in the form of string during printing by screen printing, and hence is tolerant to burning at low temperature. Although burning at lower temperature compared to conventionally used ethyl cellulose, polyvinyl butyral and the like is enabled, the burning temperature suited for degreasing is still as high as 450° C. This makes it difficult to realize satisfactory degreasing in the burning condition in which burning temperature is lower than that currently targeted, and sometimes leave residues at the time of burning.

Patent document 7, Patent document 8, Patent document 9, Patent document 10, and Patent documents 14 and 15 disclose resin binders having photoconductivity comprising (meth) acrylic polymer containing a repeating unit derived from (meth)acrylate monomer having a polyoxyethylene chain as a side chain and a hydroxyl group or an alkoxy group at an end of the side chain, used together with metal powder, fluorescent material, glass powder and the like.

Patent document 11 discloses a resin binder having photopolymerization ability which is a (meth)acrylic polymer containing a repeating unit derived from metacrylate monomer having a polyoxyethylene chain as a side chain and a carboxyl chain at its end, used together with metal powder, glass powder, ceramic powder and the like.

However, the (meth)acrylic polymer containing a polyoxyethylene chain as a side chain has a high water absorption rate and may absorb moisture under a high humidity environment. The moisture absorbed paste is problematic in that the sheet thickness is likely to vary when the paste is dried after applied by printing in a sheet form. Further, the burning temperature suited for degreasing is reported as 450° C. which is still undesired high burning temperature.

Patent document 12 discloses a material having photopolymerizing ability containing as a multi-functional polymerizable monomer component, multi-functional (meth) acrylate having a polyoxyethylene chain as a main chain, used together with inorganic powder for forming insulators, dielectrics, resistors, conductors and the like inorganic structures. This material is used as a material for forming a resin binder.

Patent document 13 discloses a material having anaerobic polymerizing ability containing as a multifunctional polymerizing monomer component, a multifunctional (meth) acrylate having a polyoxyalkylene chain as a main chain such as hexaethylene glycol diacrylate or tetraethylene glycol dimethacrylate, used together with ceramic powder. This material is used as a material for forming a resin binder.

Patent documents 12 to 15 disclose resin binders which are (meth)acrylate polymers containing a polyoxyethylene chain as a main chain or a side chain.

In an acrylic resin binder containing a polyoxyethylene chain as a main chain, however, the resin binder is likely to absorb moisture because of the presence of the polyoxyethylene chain, and when the paste absorbs moisture in a high humidity environment, the viscosity of paste is difficult to be stabilized. Further, the burning temperature suited for degreasing is reported as 450° C. which is still undesired high burning temperature.

Patent document 1: JP-A 58-150248
Patent document 2: JP-A 5-182592
Patent document 3: JP-A 2000-11865
Patent document 4: JP-A 2004-59358
Patent document 5: JP-A 9-142941
Patent document 6: JP-A 2001-49070
Patent document 7: JP-A 9-132692
Patent document 8: JP-A 9-194548
Patent document 9: JP-A 9-194551
Patent document 10: JP-A 9-208640
Patent document 11: JP-A 2000-290314
Patent document 12: JP-A 11-316456
Patent document 13: JP-A 5-157035
Patent document 14: JP-A 9-315719
Patent document 15: JP-A 2004-142964

DISCLOSURE OF THE INVENTION

It is an object of the present invention to provide a low-temperature burning binder resin composition capable of disappearing without leaving any residue upon burning at a relatively low temperature, a glass paste, a ceramic paste, a fluorescent paste, a conductive paste or the like paste, and a green sheet.

In a broad aspect of the present invention, the binder resin composition comprises as a matrix resin, copolymer (A) having a segment derived from a (meth)acrylic acid alkyl ester monomer and a polyalkylene oxide segment comprising a repeating unit shown by the chemical formula (1) below, and other component.

$$\text{—(OR)}_n\text{—} \tag{1}$$

(wherein R is alkylene group having 3 or more carbons, and n is an integer.)

The integer n in the above chemical formula is preferably 5 or more.

More preferably, the binder resin composition comprises as a matrix resin, copolymer (A) having a segment derived from a (meth)acrylic acid alkyl ester monomer, and at least one polyalkylene oxide segment selected from the group consisting of polypropylene oxide, polymethylethylene oxide, polyethylethylene oxide, polytrimethylene oxide, and polytetramethylene oxide.

In a specific aspect of the present invention, there is provided a binder resin composition which comprises as a matrix resin, copolymer (A) having a segment derived from (meth) acrylic acid alkyl ester monomer having a glass transition temperature of homopolymer of 30° C. or higher as the segment derived from (meth) acrylic acid alkyl ester monomer, and a polyalkylene oxide segment shown by Chemical formula (1).

In other specific aspect of the binder resin composition of the present invention, copolymer (A) is copolymer (A1) having as a copolymer component, a segment derived from (meth) acrylic acid alkyl ester monomer having a glass transition temperature of homopolymer of 0° C. or less.

In yet another specific aspect of the binder resin composition according to the present invention, copolymer (A) is copolymer of a copolymerizing monomer having a functional group capable of forming a hydrogen bond with a hydroxyl group.

In other specific aspect of the binder resin composition according to the present invention, the copolymerizing monomer having a functional group capable of forming a hydrogen bond with a hydroxyl group is a hydroxyl group-containing (meth)acrylic acid ester monomer.

In a further specific aspect of the binder resin composition according to the present invention, copolymer (A) contains (meth)acrylic acid long-chain alkyl ester as a copolymerizing component.

In a more specific aspect of the binder resin composition according to the present invention, the long-chain alkyl group is a long-chain alkyl group having 8 or more carbons.

In a still further specific aspect of the binder resin composition according to the present invention, a content of (meth) acrylic acid long-chain alkyl ester in 100% by weight of copolymer (A) is from 1 to 30% by weight.

In a still further specific aspect of the binder resin composition according to the present invention, copolymer (A) further contains as a copolymerizing component, 1 to 80% by weight of meth(acrylate) having a functional group capable of forming a hydrogen bond with a hydroxyl group.

Preferably, the binder resin composition according to the present invention further comprises polyalkylene oxide (B).

In a more specific aspect of the binder resin composition according to the present invention, oligomer (C) which is liquid at 23° C. is further added.

Preferably, in the binder resin composition, oligomer (C) has a SP value determined by a Hoy method of $10 \times 10^{-3}$ to $8.5 \times 10^{-3}$ $(J/m^3)^{0.5}$.

Preferably, the binder resin composition according to the present invention further comprises organic compound (D) having 3 or more hydroxyl groups.

As organic compound (D), more preferably, a compound which is liquid at room temperature is used.

In other specific aspect of the binder resin composition according to the present invention, Compound (D) having 3 or more hydroxyl groups is contained in a ratio of 20 to 200 parts by weight, relative to 100 parts by weight of copolymer (A).

Preferably, the binder resin composition according to the present invention further comprises a nonionic surfactant.

More preferably, the binder resin composition according to the present invention further comprises an organic solvent having a boiling point of 150° C. or higher is contained.

In another specific aspect of the binder resin composition according to the present invention, a Haze value determined from total light transmittance when a thick film having a thickness of 5 mm is formed is, 20 or more.

In a still another aspect of the binder resin composition according to the present invention, copolymer (A) further contains (meth)acrylate having a functional group capable of forming a hydrogen bond with a hydroxyl group, and (meth) acrylic acid long-chain alkyl ester as monomer components, and in 100% by weight of copolymer (A), the (meth)acrylate having a functional group capable of forming a hydrogen bond with the hydroxyl group occupies 1 to 80% by weight and the (meth) acrylic acid long-chain alkyl ester occupies 1 to 30% by weight, and an organic compound having three or more hydroxyl groups is further contained.

In other specific aspect of the binder resin composition according to the present invention, the binder resin composition contains (meth) acrylic acid long-chain alkyl ester as a constituting monomer of copolymer (A).

In a more specific aspect of the binder resin composition according to the present invention, the (meth)acrylic acid long-chain alkyl ester is a (meth)acrylic acid long-chain alkyl ester having 8 or more carbons.

A method of producing a burnt product according to the present invention comprises producing a ceramic green sheet using a ceramic slurry containing ceramic powder and the binder resin composition according to the present invention, and burning a laminate formed of a plurality of the ceramic green sheets at a temperature of 300° C. or less.

The glass paste according to the present invention comprises the binder resin composition according to the present invention and glass powder dispersed in the binder resin composition.

A ceramic paste according to the present invention comprises the binder resin composition according to the present invention, and ceramic powder dispersed in the binder resin composition.

A phosphor paste according to the present invention comprises the binder resin composition according to the present invention and phosphor or fluorescent powder dispersed in the binder resin composition.

A conductive paste according to the present invention comprises the binder resin composition according to the present invention, and conductive powder dispersed in the binder resin composition.

A green sheet according to the present invention comprises the binder resin composition according to the present invention and glass powder or ceramic powder dispersed in the binder resin composition.

The details of the present invention will be explained below.

Through diligent efforts, inventors of the present invention found that a polymer containing polyoxyalkylene segment of Chemical formula (1) exerts excellent disappearing property at a relatively low temperature such as 400° C. or less desired for the binder resin composition at the time of forming a ceramic green sheet, a conductive paste, a partition of PDP, a dielectric layer, a fluorescent layer or the like, and finally accomplished the present invention.

Copolymer (A) has a polyalkylene oxide segment of Chemical formula (1). Due to the presence of the polyalkylene oxide segment, a content of oxygen component in the entire resin is increased, and the binder resin is prevented from remaining as a carbonated residue at the time of burning.

$$—(OR)_n— \qquad (1)$$

(wherein R is alkylene group having three or more carbons, and n is an integer.)

A content of the polyalkylene oxide segment in copolymer (A) is not particularly limited, however, its preferred lower limit is 1% by weight, preferred upper limit is 80% by weight, more preferred upper limit is 60% by weight, and more preferred upper limit is 50% by weight. If it is less than 1% by weight, the carbonated residue may not be prevented from remaining, whereas if it exceeds 80% by weight, adherence appears in the resin for the case of the polyalkylene oxide segment of Chemical formula (1) represented by a polypropylene oxide segment having relatively weak cohesion, and blocking is likely to occur, making handling difficult. More preferred lower limit is 3% by weight, particularly preferred upper limit is 40% by weight, and more preferred upper limit is 30% by weight.

Preferably, the integer n in Chemical formula (1) is 5 or more. If n is less than 5, decomposition at a relatively lower temperature may become difficult depending on the burning time. More preferably, "n" is from 5 to 1000, more preferably from 5 to 500, and further preferably from 5 to 200. When n exceeds 1000, thixotropic nature may become difficult to appear.

More specifically, copolymer (A) having a segment derived from (meth)acrylic acid alkyl ester monomer and at least one polyalkylene oxide segment selected from the group consisting of polypropylene oxide, polymethylethylene oxide, polyethylethylene oxide, polytrimethylene oxide, and polytetramethylene oxide is preferred.

Particularly preferred are polypropylene oxide, polymethylethylene oxide, polyethylethylene oxide, and polytetramethylene oxide because they are feasible to burning at low temperature. Herein, (meth) acrylic acid alkyl ester is a generic designation for acrylic acid alkyl ester and methacrylic acid alkyl ester. Here, (meth) acrylic acid alkyl ester is preferably methacrylic acid alkyl ester, because a residue is unlikely to remain after burning for the case of methacrylic acid alkyl ester.

The position at which the segment derived from (meth) acrylic acid alkyl ester monomer and the polyoxyalkylene segment bind in the above copolymer (A) may be in such a positional relationship that it can covalently bind to a side chain and/or an end of the poly(meth)acrylic acid alkyl ester segment containing (meth)acrylic acid alkyl ester. And the segment derived from (meth) acrylic acid alkyl ester monomer and the polyoxyalkylene segment may be alternately block-copolymerized.

FIG. 1 is a schematic view showing the form of binding between the segment derived from (meth) acrylic acid alkyl ester monomer and the polyoxyalkylene segment. The way of connection between segments is, for example, (A) to (G).

Preferably, copolymer (A) has a segment derived from (meth)acrylic acid alkyl ester monomer having a glass transition temperature of homopolymer of 30° C. or higher.

The (meth)acrylic acid alkyl ester component having a glass transition temperature of homopolymer of 30° C. or higher imparts excellent binding ability against inorganic powder such as glass powder or ceramic powder, and an ability of making coating film face tack free to facilitate prevention of adhesion of dusts. If the grass transition temperature is less than 30° C., tack becomes more likely to appear on the coating film face and adhesion of dusts and blocking are more likely to occur. Preferably, it is 40° C. or higher.

The (meth)acrylic acid alkyl ester having a glass transition temperature of homopolymer of 30° C. or higher is not particularly limited, and methyl methacrylate, ethyl methacrylate, propyl methacrylate, tert-butyl methacrylate, isobutyl methacrylate, cyclohexyl methacrylate, isobornyl methacrylate, n-stearyl methacrylate, benzylmethacrylate, isobornylacrylate, benzyl acrylate and the like can be exemplified.

Copolymer (A) may be copolymer (A1) having a segment derived from (meth)acrylic acid alkyl ester monomer having a glass transition temperature of homopolymer of 0° C. or less as a copolymer component. In such copolymer (A1), by adjusting the content of the segment derived from (meth) acrylic acid alkyl ester monomer, it is possible to readily adjust the viscosity of the binder resin composition according to the present invention.

The (meth) acrylic acid alkyl ester monomer having a glass transition temperature of homopolymer of 0° C. or less is not particularly limited, and examples include ethyl acrylate, n-butyl acrylate, tert-butyl acrylate, isoamyl acrylate, 2-ethylhexyl acrylate, n-octyl acrylate, isooctyl acrylate, isononyl acrylate, isomyristyl acrylate, lauryl methacrylate, isodecyl methacrylate, and tridecyl methacrylate, 2-ethylhexyl methacrylate. Among these, lauryl methacrylate, 2-ethylhexyl methacrylate and the like are preferred because of their excellent decomposability.

In copolymer (A1), the ratio between the segment derived from (meth)acrylic acid alkyl ester monomer having a glass transition temperature of homopolymer of 30° C. or higher, and the segment derived from (meth)acrylic acid alkyl ester monomer having a glass transition temperature of homopolymer of 0° C. or less is not particularly limited, and may be appropriately selected. However, it is preferably 100:0 to 50:50 by weight ratio. If the ratio of the segment derived from the methacrylic acid alkyl ester monomer having a glass transition temperature of homopolymer of 30° C. or higher is less than the above ratio, tack is likely to occur in the coating surface, and adhesion of dusts or blocking is likely to occur. More preferably, the ratio is from 100:0 to 70:30.

In order to reduce the "stringiness" by sufficient appearance of the thixotropic nature of the binder resin composition, copolymer (A) is more preferably a copolymer having a functional group capable of forming a hydrogen bond with a hydroxyl group.

Copolymer (A) is obtainable, for example, by a copolymerizing (meth)acrylate monomer containing a hydroxyl group, a carboxyl group and a nitrogen atom. Further, the (meth)acrylate monomer is preferably methacrylic acid alkyl ester which produces little decomposition residue after burning. Examples of the hydroxyl group-containing methacrylic acid ester monomer include 2-hydroxyethyl methacrylate, 2-hydroxypropyl methacrylate, 3-hydroxypropyl methacrylate, 4-hydroxybutyl methacrylate, cyclohexanedimethanol monomethacrylate, neopentylglycol monomethacrylate, glycerol monomethacrylate, trimethyrol propane monomethacrylate, and pentaerythritol monomethacrylate.

Examples of the carboxyl group containing methacrylic acid ester monomer include methacrylic acid, 2-carboxyethylmethacrylate, and 2-methacryloyloxyethyl succinic acid.

Examples of the methacrylic acid ester monomer having a functional group containing a nitrogen atom include methacrylamide, methacrylonitrile, N-vinylpyrrolidone, N-methacryloylmorpholine, 2-N,N-dimethylaminoethyl methacrylate, and 2-N,N-diethylaminoethyl methacrylate.

Among these, a hydroxyl group-containing methacrylate is preferred because it leaves little decomposition residue after burning.

A preferred content of the hydroxyl group-containing (meth)acrylic acid ester monomer in copolymer (A) is 30% by weight or less in 100% by weight of copolymer (A).

Higher contents will result in excess water absorptivity, making it difficult to obtain a composition keeping stable viscosity in a long term when glass powder is dispersed in preparation of a paste. More preferably, it is 1 to 15 by weight.

A molecular weight of copolymer (A) is not particularly limited, however, a preferred lower limit of number average molecular weight is 500, and a preferred upper limit is 200,000. Although copolymers having a molecular weight of less than 500 may also be used, a paste having a viscosity that is suited for printing would not be obtained because the resultant polymer has a low molecular weight. Also there is a case that sufficient cohesion is not obtained. When the molecular weight exceeds 200,000, the effect of entanglement of polymer molecule is strengthened, and prevention of "stringiness" at the time of coating may become difficult. More preferred upper limit is 150,000, and more preferred lower limit is 10,000.

For producing copolymer (A), free radical polymerization, living radical polymerization, iniferter polymerization, anion polymerization, living anion polymerization and the like conventional methods can be used.

In one example of obtaining a copolymer shown in FIG. 1, (meth) acrylic acid alkyl ester monomer is polymerized in the presence of a chain transfer agent having a carboxyl group, and a carboxyl group introduced into an end is allowed to react with and bind with a hydroxyl group at an end of polyoxylene oxide. As a result, a (meth) acrylic resin having a main chain into which polyalkylene oxide is introduced is obtained.

Further, as a method of introducing into a side chain, a polyalkylene oxide having a copolymerizable functional group capable of copolymerizing with (meth) acrylic acid alkyl ester may be copolymerized with (meth) acrylic acid alkyl ester, to thereby obtain an acrylic resin having a side chain into which polyalkylene oxide is introduced.

The compound having a copolymerizable functional group capable of copolymerizing with (meth) acrylic acid alkyl ester and polyalkylene oxide is not particularly limited, and examples include compounds having a (meth)acrolyl group at an end of the polyalkylene oxide shown by general formulas (2) to (13) below.

[Chemical Formula 1]

$$CH_2=CH-C(O)O-[CH_2CH(CH_3)O]_n-H \quad (2)$$

(n=1-12)

$$CH_2=C(CH_3)-C(O)O-[CH_2CH(CH_3)O]_n-H \quad (3)$$

(n=1-12)

$$CH_2=C(CH_3)-C(O)O-(CH_2CH_2O)_n-[CH_2CH(CH_3)O]_m-H \quad (4)$$

(n=1-12, m=1-12)

$$CH_2=CH-C(O)O-(CH_2CH_2O)_n-[CH_2CH(CH_3)O]_m-H \quad (5)$$

(n=1-12, m=1-12)

$$CH_2=C(CH_3)-C(O)O-(CH_2CH_2O)_n-(CH_2CH_2CH_2CH_2O)_m-H \quad (6)$$

(n=1-12, m=1-12)

$$CH_2=CH-C(O)O-(CH_2CH_2O)_n-(CH_2CH_2CH_2CH_2O)_m-H \quad (7)$$

(n=1-12, m=1-12)

$$CH_2=CH-C(O)O-[CH_2CH(CH_3)O]_n-CH_3 \quad (8)$$

(n=1-10)

$$CH_2=C(CH_3)-C(O)O-[CH_2CH(CH_3)O]_n-CH_3 \quad (9)$$

(n=1-10)

$$CH_2=C(CH_3)-C(O)O-(CH_2CH_2O)_n-[CH_2CH(CH_3)O]_m-CH_3 \quad (10)$$

(n=1-10, m=1-10)

$$CH_2=CH-C(O)O-(CH_2CH_2O)_n-[CH_2CH(CH_3)O]_m-CH_3 \quad (11)$$

(n=1-10, m=1-10)

$$CH_2=CH-C(O)O-[CH_2CH(CH_3)O]_n-C(O)-CH=CH_2 \quad (12)$$

(n=1-20)

$$CH_2=C(CH_3)-C(O)O-[CH_2CH(CH_3)O]_n-C(O)-C(CH_3)=CH_2 \quad (13)$$

(n=1-20)

Copolymer (A) may have a cross-linkable function group at a side chain or at an end. Since copolymer (A) has a cross-linkable function group at its side chain or at its end, and then the binder resin composition of the present invention exerts excellent moldability and transfer ability in formation of a partition of PDP in a transfer method which is one exemplary application of the present invention.

The term cross-linkable function group used herein means a group that causes cross-linking reaction upon light irradiation and/or heating, and among others, a cross-linkable function group that causes cross-linking reaction upon light irradiation is preferred because it can be readily cured by UV irradiation and has no fear that heat history is left in the binder resin.

Examples of the cross-linkable function group include, but are not limited to, hydrolysable silyl group, isocyanate group, epoxy group, oxetanyl group, acid anhydride group, carboxyl group, hydroxyl group, and polymerizable unsaturated hydrocarbon group. Among these, the one selected from hydrolysable silyl group, isocyanate group, epoxy group, oxetanyl group, acid anhydride group, carboxyl group, hydroxyl group, and polymerizable unsaturated hydrocarbon group is preferred, and the one selected from hydrolysable silyl group, epoxy group and oxetanyl group is more preferred, and hydrolysable silyl group is further preferred. These cross-linkable function groups may be used singly or in combination of two or more kinds.

The binder resin composition of the present invention preferably contains a cross-linking agent for cross-linking the cross-linkable function group when copolymer (A) has a cross-linkable function group at a side chain or at an end.

As the cross-linking agent, those reacting with a cross-linkable function group possessed by copolymer (A) to be incorporated into a structure of the cross-linking member (hereinafter, referred to as reactive cross-linking agent), and those acting as a catalyst for reaction between the cross-linkable function groups possessed by copolymer (A) (hereinafter, referred to as catalytic cross-linking agent) can be exemplified. Also known is a cross-linking agent having both functions of the reactive cross-linking agent and the catalytic cross-linking agent (hereinafter, referred to as reactive-catalytic cross-linking agent).

The reactive cross-linking agent is not particularly limited, and when the cross-linkable function group possessed by copolymer (A) is an oxetanyl group, an optical cation initiator that generates acid under radiation of a UV ray or visible ray, and thermal cation initiator and the like can be exemplified.

As the reactive cross-linking agent, when the cross-linkable function group possessed by copolymer (A) is an isocyanate group, for example, compounds having a plurality of active hydrogens such as compounds having a plurality of hydroxyl groups and compounds having a plurality of amino groups can be exemplified.

Examples of the compounds having a plurality of hydroxyl groups include ethylene glycol, butylene glycol, glycerin, neopentyl glycol, 1,6-hexane diol, 1,4-cyclohexanedimethanol, penta erythritol, and polyester polyol. Examples of the compounds having a plurality of amino groups include hexamethylene diamine, tetramethylene diamine, and α,ω-diaminopropylene glycol.

The above catalytic cross-linking agent is not particularly limited, and when the cross-linkable function group possessed by copolymer (A) is a hydrolysable silyl group, for example, a photoreactive catalyst having a functional group shown by the general formula (14), an optical cation initiator that generates acid under radiation of a UV ray or visible ray, an organic metal compound, an amine-based compound, an acidic phosphate ester, a tetraalkyl ammonium halide (halide: fluoride, chloride, bromide, iodide), carboxylic group and the like organic acids, hydrochloric acid, sulfuric acid, nitric acid and the like inorganic acids can be exemplified. Among these, a photoreactive catalyst having a functional group shown by the following general formula (14) is preferred.

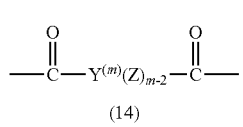

[Chemical formula 2]

In the general formula (14); m represents an integer of 2 to 5; Y(m) represents an atom of Group IVB, Group VB or Group VIB in the periodic table; Z represents a hydrogen group, hydrocarbon group, mercapto group, amino group, halogen group, alkoxy group, alkylthio group, carbonyloxy group or oxo group.

The photoreactive catalyst having the functional group shown by the general formula (14) may have different plural functional groups shown by the general formula (14).

As the functional groups shown by the general formula (14), for example, a compound having two carbonyl groups bound to an atom shown by Y(m) selected from the group consisting of oxygen, sulfur, nitrogen, phosphorous and carbon, and appropriately having a hydrocarbon group shown by Z or an oxide group depending on the number of valence of the atom shown by Y(m) can be exemplified.

As the hydrocarbon group shown by Z, an aliphatic hydrocarbon group, unsaturated aliphatic hydrocarbon group and an aromatic hydrocarbon group can be exemplified. These hydrocarbon groups may have a substituent such as amino group, hydroxyl group, ether group, epoxy group, polymerizable unsaturated group, urethane group, urea group, imide group and ester group as far as the object of the present invention is not hindered. Also a combination of different hydrocarbon groups may be used.

The photoreactive catalyst having the functional group shown by the general formula (14) may be a cyclic compound. As such a cyclic compound, for example, compounds having one or two or more same or different functional group(s) shown by the general formula (14) can be exemplified. Also, compounds comprising a plurality of same or different cyclic compounds bound by an appropriate organic group, or bicyclic compounds containing at least one unit consisting of a plurality of same or different cyclic compounds may be used.

When the atom shown by Y(m) is an oxygen atom, examples of the photoreactive catalyst having a functional group shown by the general formula (14) include acetic anhydride, propionic anhydride, butyric anhydride, isobutyric anhydride, valeric anhydride, 2-methylbutyric anhydride, trimethyl acetic anhydride, hexanic anhydride, heptanic anhydride, decanoic anhydride, lauric anhydride, myristic anhydride, palmitic anhydride, stearic anhydride, docosanoic anhydride, crotonic anhydride, acrylic anhydride, methacrylic anhydride, oleic anhydride, linoleinic anhydride, chloroacetic anhydride, iodoacetic anhydride, dichloroacetic anhydride, trifluoro acetic anhydride, chlorodifluoro acetic anhydride, trichloro acetic anhydride, pentafluoro propionic anhydride, heptafluoro butyric anhydride, succinic anhydride, methylsuccinic anhydride, 2,2-dimethylsuccinic anhydride, isobutyl succinic anhydride, 1,2-cyclohexane dicarbonic anhydride, hexandihydro-4-methylphthalic anhydride, itaconic anhydride, 1,2,3,6-tetrahydrophthalic anhydride, 3,4,5,6-tetrahydrophthalic anhydride, maleic anhydride, 2-methylmaleic anhydride, 2,3-dimethylmaleic anhydride, 1-cyclopentene-1,2-dicarbonic anhydride, glutaric anhydride, 1-naphtylacetic anhydride, benzoic anhydride, phenylsuccinic anhydride, phenylmaleic anhydride, 2,3-diphenylmaleic anhydride, phthalic anhydride, 4-methylphthalic anhydride, 3,3',4,4'-benzophenone tetracarbonic dianhydride, 4,4'-(hexafluoropropylidene)diphthalic anhydride, 1,2, 4,5-benzene tetracarbonic anhydride, 1,8-haphthalene dicarbonic anhydride, 1,4,5,8-naphthalene tetracarbonic anhydride and the like; and as a copolymer of maleic anhydride and a compound having a radical polymerizable double bond, for example, a copolymer of maleic anhydride and (meth)acrylate, a copolymer of maleic anhydride and styrene, a copolymer of maleic anhydride and vinyl ether can be exemplified. Among these, commercially available ones are, for example, ADEKA hardener EH-700, ADEKA hardener EH-703, and ADEKA hardener EH-705A available from ADEKA Corporation; RIKACID TH, RIKACID HT-1, RIKACID HH, RIKACID MH-700, RIKACID MH-700H, RIKACID MH, RIKACID SH, RIKARESIN TMEG available from New Japan Chemical Co., Ltd.; HN-5000 and HN-2000 from Hitachi Chemical; EPICURE 134A, EPICURE YH306, EPICURE YH307, and EPICURE YH308H available from Yukashell epoxy KK; and SUMICURE MS available from Sumitomo Chemical CO., Ltd.

As the photoreactive catalyst having a functional group shown by the general formula (14), when the atom shown by Y(m) is a nitrogen atom, succinimide, N-methyl succinimide, α,α-dimethyl-β-methyl succinimide, α-methyl-α-propyl succinimide, maleimide, N-methylmaleimide, N-ethylmaleimide, N-propylmaleimide, N-tert-butyl maleimide, N-lauryl maleimide, N-cyclohexyl maleimide, N-phenylmaleimide, N-(2-chlorophenyl)maleimide, N-benzyl maleimide, N-(1-pyrenyl)maleimide, 3-methyl-N-phenylmaleimide, N,N'-1,2-phenylene dimaleimide, N,N'-1,3-phenylenedimaleimide, N,N'-1,4-phenylenedimaleimide, N,N'-(4-methyl-1,3-phenylene)bismaleimide, 1,1'-(methylenedi-1,4-phenylene)bis maleimide, phthalimide, N-methyl phthalimide, N-ethyl phthalimide, N-propyl phthalimide, N-phenyl phthalimide, N-benzyl phthalimide, pyromellitic diimide and the like can be exemplified.

As the photoreactive catalyst having a functional group shown by the general formula (14), when the atom shown by Y(m) is a phosphorus atom, bis(2,6-dimethoxybenzoyl)-2,4, 4-trimethyl-pentylphosphine oxide, bis(2,4,6-trimethylbenzoyl)-phenylphosphine oxide and the like can be exemplified.

As the photoreactive catalyst having a functional group shown by the general formula (14), when the atom shown by Y(m) is a carbon atom, diketones such as 2,4-pentanedione, 3-methyl-2,4-pentandione, 3-ethyl-2,4-pentanedione, 3-chloro-2,4-pentandione, 1,1,1-trifluoro-2,4-pentanedione, 1,1,1,5,5,5-hexafluoro-2,4-pentanedione, 2,2,6,6-tetramethyl-3,5-heptanedione, 1-benzoylacetone, and dibenzoylmethane; polycarbonate esters such as dimethyl malonate, diethyl malonate, dimethylmethyl malonate, and tetraethyl 1,1,2,2-ethanetetracarbonic acid; α-carbonyl acetate esters such as methylacetyl acetonate, ethylacetyl acetonate, methyl propionyl acetate and the like can be exemplified.

Among photoreactive catalysts having a functional group shown by the general formula (14), diacylphosphine oxide or its derivative is particularly preferably used because it leaves little residues after disappearing.

A preferred use amount of the photoreactive catalyst having a functional group shown by the general formula (14) is 0.01 part by weight, relative to 100 parts by weight of copolymer (A), and preferred upper limit is 30 parts by weight. If it is less than 0.01 part by weight, photoreactivity may not be exhibited, whereas if it is more than 30 parts by weight, the optical transparency of the composition containing the binder resin of the present invention having a hydrolysable silyl group is impaired, which may result in that only the face part but not the deep part is bridged and cured upon irradiation of light. More preferred lower limit is 0.1 part by weight, and more preferred upper limit is 20 parts by weight.

Examples of the organic metal compounds used as the catalytic cross-linking agent include tin compounds such as dibutyl tin dilaurate, dibutyl tin diacetate, dibutyl tin oxide, dibutyl tin diacetate, dibutyl tin phtalate, bis(dibutyl tin lauric) oxide, dibutyl tin bisacetyl acetonate, dibutyl tin bis(monoester malate), tin octylate, dibutyl tin octoate, and dioctyl tin oxide; and alkyloxy titanates such as tetra-n-butlxytitanate and tetraisopropoxytitanate can be exemplified.

As the above catalytic cross-linking agent, when the cross-linkable function group possessed by copolymer (A) is a polymerizable unsaturated group, thermal radical initiators such as peroxides and azo compounds; optical radical initiators responding to radiation of a UV ray or visible ray; and initiator systems combining a thermal or optical radical initiator and a compound having a plurality of mercapto groups can be exemplified.

As the thermal radical initiator, hydroperoxides such as diisopropylbenzen hydroperoxide, 1,1,3,3-tetramethylbutyl hydroperoxide, cumene hydroperoxide, tert-hexyl hydroperoxide, tert-butyl hydroperoxide; dialkyl peroxides such as α,α'-bis(tert-butylperoxy-m-isopropyl)benzen, dicumyl peroxide, 2,5-dimethyl-2,5-bis(tert-butylperoxy)hexane, tert-butylcumyl peroxide, di-tert-butyl peroxide, and 2,5-dimethyl-2,5-bis(tert-butyl peroxy)hexine-3; ketone peroxides, peroxyketals, diacyl peroxides, peroxydicarbonates, peroxyesters and the like organic peroxides, or azo compounds such as 2,2'-azobis isobutyronitril, 1,1'-(cyclohexane-1-carbonytrile), 2,2'-azobis (2-cyclopropylpropionitrile), and 2,2'-azobis (2,4-dimethylvalero nitrile) can be exemplified.

As the optical radical initiator, acetophenone derivative compounds such as 4-(2-hydroxyethoxy)phenyl(2-hydroxy-2-propyl)ketone, α-hydroxy-α,α'-dimethylacetophenone, methoxyacetophenone, and 2,2-dimethoxy-2-phenylacetophenone; benzoin ether compounds such as benzoin ethyl ether, and benzoin propyl ether; ketal derivative compounds such as benzyldimethyl ketal; halogenated keton; acylphosphine oxide; acylphosphonate; 2-methyl-1-[4-(methylthio) phenyl]-2-morpholinopropane-1-on, 2-benzyl-2-N,N-dimethyl-amino1-(4-morpholinophenyl)-1-butan one; bis(2,4,6-trimethylbenzoyl)-phenylphosphine oxide, bis-(2,6-dimethoxybenzoyl)-2,4,4-trimethylpentylphosphine oxide; bis(η5-cyclopentadienyl)-bis(pentafluorophenyl)-titanium, bis(η5-cyclopentadienyl)-bis[2,6-difluoro-3-(1H-pyr-1-yl) phenyl]-titanium; anthracene, perylene, coronene, tetracene, benzanthracene, phenothiazine, flavin, acridine, ketocoumarin, thioxanthone derivative, benzophenone, acetophenone, 2-chlorothioxanthone, 2,4-dimethylthioxanthone, 2,4-diethylthioxanthone, 2,4-diisopropylthioxanthone, isopropylthioxanthone and the like can be exemplified. These may be used singly or in combination of two or more kinds.

As the catalytic cross-linking agent, when the cross-linkable function group possessed by copolymer (A) is an epoxy group, for example, an optical cation initiator that generates acid in response to radiation of a UV ray or visible ray, thermal cation initiator, amine compound based curative agent, amide based curative agent, acid anhydride based curative agent, mercapto based curative agent, thermolatent curative agents such as ketimine and DICY, optical amine generators having carbamoyl oxyimino group are exemplified.

As the optical cation catalyst, iron-allene complex compound, aromatic diazonium salt, aromatic iodonium salt, aromatic sulfonium salt, pyridinium salt, aluminum complex/silanol salt, and trichloromethyltriazine derivative can be exemplified. Among these, as a counter anion of onium ion or pyridinium salt, for example, $SbF_6^-$, $PF_6^-$, $AsF_6^-$, $BF_4^-$, tetrakis(pentafluoro)borate, trifluoromethane sulfonate, methane sulfonate, trifluoro acetate, acetate, sulfonate, tosylate, nitrate and the like can be exemplified. Examples of commercially available optical cation catalyst include IRGACURE 261 (Ciba-Geigy), OPTOMER SP-150 (ADEKA Corporation), OPTOMER SP-151 (ADEKA Corporation), OPTOMER SP-170 (ADEKA Corporation), OPTOMER SP-171 (ADEKA Corporation), UVE-1014 (General electronics), CD-1012 (Sartomer Company), Sun-aid SI-60L (SANSHIN CHEMICAL INDUSTRY), Sun-aid SI-80L (SANSHIN CHEMICAL INDUSTRY), Sun-aid SI-100L (SANSHIN CHEMICAL INDUSTRY), CI-2064 (NIPPON-SODA CO., LTD), CI-2639 (NIPPON SODA CO., LTD), CI-2624 (NIPPON SODA CO., LTD), CI-2481 (NIPPON SODA CO., LTD), RHODORSILPHOTOINITIATOR2074 (RHONE-POULENC), UVI-6990 (Union Carbide Corporation), BBI-103 (Midori Kagaku Co., Ltd.), MPI-103 (Midori Kagaku Co., Ltd.), TPS-103 (Midori Kagaku Co., Ltd.), MDS-103 (Midori Kagaku Co., Ltd.), DTS-103 (Midori Kagaku Co., Ltd.), NAT-103 (Midori Kagaku Co., Ltd.), and NDS-103 (Midori Kagaku Co., Ltd.). These optical cation catalysts may be used singly or in combination of two or more kinds.

As the thermal cation curative agent, for example, ammonium salt having at least one alkyl group, sulfonium salt, iodonium salt, diazonium salt, boron trifluoride/triethyl amine complex and the like can be exemplified. As a counter anion of these salts, for example, $SbF_6^-$, $PF_6^-$, $AsF_6^-$, $BF_4^-$ tetrakis(pentafluoro)borate, trifluoromethane sulfonate, trifluoro acetate, acetate, sulfonate, tosylate, nitrate and the like anions can be exemplified.

As the optical amine generator, compounds having carbamoyloxy imino group, cobalt amine complex, carbamic acid-o-nitrobenzyl, o-acyloxime and the like can be exemplified.

As the above reactive-catalytic cross-linking agent, α,ω-diaminopolyoxy propylene can be exemplified without particular limitation.

As a compound having a copolymerizing functional group capable of copolymerizing with (meth) acrylic acid alkyl ester, and a cross-linkable function group, 3-methacryloyloxy propyl trimethoxy silane, 3-methacryloyloxy propyl dimethoxy silane, glycidyl methacrylate, 3-methacryloyloxy propyl isocyanate and the like can be exemplified.

As a compound having a functional group that allows formation of bond with the compound having a copolymerizing functional group capable of copolymerizing with (meth) acrylic acid alkyl ester, and a cross-linkable function group, 2-hydroxyethyl(meth)acrylate, 3-hydroxypropyl(meth)acrylate, 2-hydroxypropyl(meth)acrylate, 4-hydroxybutyl(meth) acrylate, 2-hydroxybutyl(meth)acrylate, 5-hydroxypentyl (meth)acrylate, 6-hydroxyhexyl(meth)acrylate, 3-hydroxy-3-methylbutyl(meth)acrylate, 2-hydroxy-3-phenoxypropyl (meth)acrylate, 2-[(meth)acryloyloxy]ethyl-2-hydroxyethylphthalic acid, 2-[(metha)acryloyloxy]ethyl-2-hydroxypropyl-phthalic acid and the like can be exemplified without being limited thereto.

When the functional group of the compound having a functional group that forms a bond with a compound having a copolymerizing functional group capable of copolymerizing with (meth) acrylic acid alkyl ester, and a cross-linkable function group, is a hydroxyl group, 3-(trimethoxysilyl)propyl isocyanate, 3-(triethoxysilyl)propyl isocyanate maleic anhydride and the like are exemplified.

Further, when the functional group of the compound having a functional group that forms a bond with a compound having a copolymerizing functional group capable of copolymerizing with (meth) acrylic acid alkyl ester, and a cross-linkable function group, is a carboxyl group, glycidyl(meth) acrylate, bisphenol A type epoxy resin, bisphenol F type epoxy resin, hydrogenated bisphenol A type epoxy resin and the like can be exemplified.

Preferably, the binder resin composition according to the present invention further comprises polyalkylene oxide (B) for the purpose of lowering the burning temperature. Examples of polyalkylene oxide (B) include, but are not limited to, polyethylene glycol, polypropyrene glycol, polytrimethylene glycol, polytetramethylene glycol, poly(ethyl) ethylene glycol, poly(benzyl)ethylene glycol and copolymer thereof. A number average molecular weight of polyalkylene oxide (B) is not particularly limited, and may be appropriately selected in accordance with the objective viscosity of the binder resin composition according to the present invention. Here, the number average molecular weight is preferably 300 to 100,000. More preferably, it is from 1000 to 500,000.

As a blending amount of polyalkylene oxide (B), a preferred upper limit with respect to 100 parts by weight of copolymer (A) is 200 parts by weight. If it is more than 200 parts by weight, so-called "low temperature burnability" appears in which burning at low temperature is facilitated due to polyalkylene oxide (B), however, phase separation is more likely to occur depending on the combination between copolymer (A) and polyalkylene oxide (B), which makes it difficult to obtain a paste of stable viscosity. Preferred upper limit is 100 parts by weight, and more preferably 50 parts by weight.

Preferably, the binder resin composition of the present invention is further added with resin oligomer (C) which is in liquid at room temperature, or at 23° C. in order to further suppress the "stringiness". In order to prevent phase separation of the binder resin composition, an oligomer having a SP value of oligomer (C) determined by Hoy method of $10 \times 10^{-3}$ to $8.5 \times 10^{-3}$ $(J/m^3)^{0.5}$ is preferred. For example, polypropyrene glycol (SP value: $8.65 \times 10^{-3}$ $(J/m^3)^{0.5}$) exemplified in the above (B), polyester polyol oligomer, butyl acrylate oligomer (SP value: $9.77 \times 10^{-3}$ $(J/m^3)^{0.5}$), 2-ethylhexylacrylate oligomer (SP value: $9.22 \times 10^{-3}$ $(J/m^3)^{0.5}$) polyisoprene oligomer (SP value: $8.75 \times 10^{-3}$ $(J/m^3)^{0.5}$) polybutadiene oligomer (SP value: $8.73 \times 10^{-3}$ $(J/m^3)^{0.5}$) laurylmethacrylate oligomer (SP value: $8.81 \times 10^{-3}$ $(J/m^3)^{0.5}$) and the like can be exemplified.

Preferably, the binder resin composition of the present invention further comprises a decomposition accelerator. By containing a decomposition accelerator, it is possible to hasten disappearance at the time of burning. Examples of the above decomposition accelerator include, but are not limited to, azo compounds; heavy metal compound such as iron sulfate, sodium nitrate, and cobalt naphthenate; carboxylic acids such as oxalic acid, linoleic acid and ascorbic acid; hydroquinone, peroxide and tin oxide. Among these, peroxide is preferred because residues of decomposition can be suppressed low by the decomposition accelerator. Further, the azo compound is preferred because volatilization of decomposed matter can be promoted by nitrogen gas occurring by decomposition of the azo compound, while decomposition is promoted by the decomposition accelerator.

The peroxide is not particularly limited, and may be an inorganic peroxide or organic peroxide.

Examples of the inorganic peroxide include potassium persulfate, sodium persulfate, ammonium persulfate, potassium perchlorate, sodium perchlorate, ammonium perchlorate, and potassium periodate.

As the organic peroxide, those having a 10-hour half-life temperature of 100° C. or higher are preferred from the view point of storageability. Examples of the organic peroxide having a 10-hour half-life temperature of 100° C. or higher include hydroxy peroxides such as p-methane hydroxy peroxide, diisopropylbenzene hydroxyperoxide, 1,1,3,3-tetramethylbutyl hydroxy peroxide, cumene hydroxy peroxide, t-hexyl hydroxyperoxide, and t-butyl hydroxy peroxide; dialkyl peroxides such as dicumyl peroxide, α,α'-bis(t-butyl peroxy-m-isopropylbenzene), 2,5-dimethyl-2,5-bis(t-butyl peroxy)hexane, t-butylcumyl peroxide, di-t-butyl peroxide, and 2,5-dimethyl-2,5-bis(t-butyl peroxy)hexyne-3; peroxy ketals such as 1,1-bis(t-hexylperoxy)-3,3,5-trimethylcyclohexane, 1,1-bis (t-hexylperoxy)cyclohexane, 1,1-bis(t-butyl peroxy)-3,3,5-trimethylcyclohexane, 1,1-bis(t-butyl peroxy) cyclohexane, 1,1-bis(t-butyl peroxy)cyclodecane, 2,2-bis(t-butyl peroxy)butane, n-butyl4,4-bis(t-butyl peroxy)valerate, and 2,2-bis(4,4-di-t-butyl peroxy cyclohexyl)propane; peroxy esters such as t-hexyl peroxyisopropyl monocarbonate, t-butyl peroxy maleic acid, t-butyl peroxy 3,5,5-trimethylhexanoate, t-butyl peroxy laurate, 2,5-dimethyl-2,5-bis(m-toluoylperoxy)hexane, t-butylperoxy isopropyl monocarbonate, t-hexylperoxy benzoate, 2,5-dimethyl-2,5-bis(m-benzoylperoxy)hexane, t-butyl peroxy acetate, t-butyl peroxybenzoate, bis-t-butylperoxy isophthalate, and t-butylperoxy allyl monocarbonate.

Examples of the azo compound include, but are not limited to, azodicarbon amide, azobisisobutyronitrile (AIBN), 2,2-azobis(4-methoxy-2,4-dimethylvarelo nitrile), 2,2-azobis(2-cyclopropylpropionitrile), 2,2-azobis (2-methylbutyro nitrile), and 1,1-azobis (cyclohexane-1-carbonitrile).

The binder resin composition of the present invention may further contain a decomposition retardant for the purpose of improving handleability. Examples of the decomposition retardant include, but are not limited, mercapto compound, amine compound, organic tin, and organic boron.

Examples of the mercapt compound include, but are not limited to propanethiol, butanethiol, pentanethiol, 1-octanethiol, dodecanethiol, cyclopentanethiol, cyclohexanethiol, 1,3-propanediol and the like.

Examples of the amine compound include, but are not limited to, propyl amine, butyl amine, hexyl amine, dodecyl amine, isopropyl amine, hexamethylene diamine, cyclohexyl amine, benzyl amine, aniline, methylaniline and the like.

Examples of the organic tin include, but are not limited to, dimethyl tin dilaurate, dibutyl tin dilaurate, dibutyl tin dioctate, dibutyl tin diacetate, dibutyl tin bis (2,4-pentanedione), and dilauryl tin dilaurate.

Examples of the organic boron include, but are not limited to, trimethylborate, tripropylborate, tributylbolate, trimethoxy boroxine, and trimethylene borate.

The content of the above decomposition accelerator or decomposition retardant in the binder resin composition of the present invention is not particularly limited, and preferred lower limit is 1% by weight, and preferred upper limit is 10% by weight.

The binder resin composition of the present invention may contain a gas generator that generates gas upon light irradiation and/or heating. By containing a gas generator, when the binder resin composition of the present invention is cured by a PDP partition transferring method described as one exemplary application of the present invention, gas generates from the surface thereof, and removal from the frame is promoted by pressure of the gas. As such a gas generator, azo compounds, azide compounds and the like are exemplified.

The binder resin composition of the present invention may contain a liquid resin. By containing a liquid resin, a temperature at which disappearance of the binder resin composition of the present invention starts can be lowered, and viscosity can be adjusted. Also, rapid disappearance is enabled at a temperature around 150° C. The liquid resin is not particularly limited insofar as it is a compound having a boiling point of 100° C. or higher, and as such, polyethylene glycol oligomer, polypropyrene oligomer, polytetramethylene glycol oligomer, dioctylphthalate, dibutyl phthalate, and glycerin monooleic ester can be exemplified.

The low-temperature decomposable binder resin composition may contain a filler for the purpose of improving agglutinability. Since such a filler essentially turns into inorganic residues, the content thereof should be necessity minimum.

Examples of the filler include, but are not limited to, titanium oxide, alumina, colloidal calcium carbonate, heavy calcium carbonate, barium carbonate, magnesium carbonate, silica, surface-treated silica, silicate calcium, silicon anhydride, hydrous silicon, mica, surface-treated mica, talc, clay, surface-treated talc, boron nitride, aluminum nitride, carbon nitride, carbon black, white carbon, glass short fiber, glass beads, glass balloon, cilasballoon, acryl beads, and olyethylene beads.

The binder resin composition of the present invention may contain a silane coupling agent. Examples of the silane coupling agent include, vinyltrimethoxy silane, dimethyldimethoxy silane, methyltrimethoxy silane, methyltriethoxy silane, tetramethoxy silane, tetraethoxy silane, phenyltrimethoxy silane, diphenyldimethoxy silane, 3-aminopropyltrimethoxy silane, 3-aminopropylmethyldimethoxy silane, 3-aminopropyltriethoxy silane, N-(2-aminoethyl)-3-aminopropyltrimethoxy silane, N-(2-aminoethyl)-3-aminopropyltriethoxy silane, N,N'-bis-[3-(trimethoxysilyl)propyl] ethylene diamine, N,N'-bis-[3-(triethoxysilyl)propyl] ethylene diamine, N,N'-bis-[3-(trimethoxysilyl)propyl] hexaethylene diamine, and N,N'-bis-[3-(triethoxysilyl) propyl]hexaethylene diamine.

The binder resin composition of the present invention may contain a titanium coupling agent. Examples of the titanium coupling agent include: for example, isopropyltriisostealoyl titanate, isopropyl-n-dodecylbenzenesulfonyl titanate, isopropyl tris (dioctylpyrophosphate) titanate, tetraisopropylbis (dioctyl phosphite) titanate, tetraisopropylbis(ditridecyl phosphite) titanate, tetra (2,2-diallyloxymethyl-1-butyl)bis (di-tridecyl)phosphite titanate, bis(dioctylpyro phosphate) oxyacetate titanate, bis (dioxtyl pyrophosphate) ethylene titanate, and isopropyltri (N-aminoethyl-aminoethyl)titanate.

As the component that is bound by the binder resin composition of the present invention, low-melting point glass such as lead borosilicate glass, lead glass, $CaO.Al_2O_3.SiO_2$-based inorganic glass, $MgO.Al_2O_3.SiO_2$-based inorganic glass, and $Li_2O.Al_2O_3.SiO_2$-based inorganic glass; fluorescent substances such as ZnS:1g,Al, ZnS:Cu,Al, $Y_2O_2S$:Eu, $(SrCaBaMg)_5(PO_4)_3Cl$:Eu, $LaPO_4$:Ce, Tb, $Y_2O_3$:Eu, $Ca_{10}(PO_4)_6FCl$:Sb,Mn, $BaMgAl_{10}O_{17}$:Eu, $Zn_2SiO_4$:Mn, (Y,Gd)$BO_3$:Eu, $CaWO_4$, $Gd_2O_2S$:Tb, (Y,Sr)$TaO_4$:Nb; metal powder such as aluminum, gold, platinum, silver, copper, and nickel; and appropriate glass, ceramic powder or metal oxide powder of silver oxide, alumina, titanium oxide, zirconium oxide, indium oxide, indium tin oxide, magnesium oxide, zinc oxide and the like can be exemplified.

In a specific aspect of the present invention, there is provided a method of producing a burnt product, which comprise producing a ceramic green sheet using a ceramic slurry containing ceramic powder, and a binder resin having an acrylic polymer chain and a polyoxyalkylene chain, and burning a laminate overlaying a plurality of the ceramic green sheets at a temperature of 300° C. or less.

Inventors of the present invention developed as a binder resin which allows decreasing process of ceramic green sheet at low temperature, a binder resin based on a polyoxyalkylene resin which decomposes at around 300° C. and disappears as previously disclosed in JP-A 2004-256788. This binder resin, however, is suffer from the difficulty in control of burning temperature when heated to about 300° C. because of the pressure of high ratio of oxygen atoms in the resin molecule, and a burning crack may occur as a result of severe burning. Additional, the low viscosity makes it difficult to produce a ceramic green sheet using a ceramic slurry prepared by mixing a ceramic material and a solvent and the like. In consideration of this, inventors of the present invention made further diligent efforts, and found that use of a binder resin containing an acrylic polymer segment and a polyoxyalkylene segment makes it possible to conduct a degreasing process and control thereof at such a low temperature as around 300° C. and realize low viscosity.

In the method of producing a burnt product using the binder resin composition of the present invention, first, a ceramic slurry containing ceramic powder, and the binder resin having an acrylic polymer segment and a polyoxyalkylene segment is prepared. As the ceramic powder, any ceramic powder that can be burnt at low temperature of 300° C. or less may be used without any limitation, and preferred is a mixture of at least one glass material selected from the group consisting of $CaO—Al_2O_3—SiO_2—B_2O_3$ based, $MgO—Al_2O_3—SiO_2—B_2O_3$ based, and $CaO—MgO—Al_2O_3—SiO_2—B_2O_3$ based glass materials, and $Al_2O_3$.

The content of CaO and/or MgO in the glass material of ceramic powder is not particularly limited, and a preferred lower limit is 10% by weight, and a preferred upper limit is 55% by weight. The content of $Al_2O_3$ in the glass material of ceramic powder is not particular limited, and a preferred upper limit is 30% by weight.

The content of $SiO_2$ in the glass material of ceramic powder is not particular limited, and a preferred lower limit is 45% by weight and a preferred upper limit is 75% by weight. The content of $B_2O_3$ in the glass material of ceramic powder is not particular limited, and a preferred upper limit is 30% by weight.

The blending ratio between the glass material and $Al_2O_3$ in the ceramic powder is not particularly limited, however it is preferably in the range of 50:50 to 65:35 by weight ratio.

The ceramic powder content in the ceramic slurry is not particularly limited, and a preferred lower limit is 5 parts by weight and a preferred upper limit is 50 parts by weight, relative to 100 parts by weight of the binder resin having an acrylic polymer segment and a polyoxyalkylene segment. If it is less than 5 parts by weight, a burnt product having sufficient strength is not obtained, whereas if it exceeds 50 parts by weight, molding of a ceramic green sheet is disabled.

The ceramic slurry may have an organic solvent. The organic solvent preferably has a boiling point of 150° C. or more from the view point of stability of solids and viscosity stability in printing. Examples of such organic solvent include, but are not limited to, terpineol, ethylene glycol ethyl ether, ethylene glycol monobutyl ether, ethylene glycol monoethyl ether acetate, butylcarbitol, butylcarbitol acetate, isoforon, butyl lactate, dioctyl phthalate, dioctyl adipate, benzyl alcohol, phenyl propylene glycol and cresol.

The method of producing the above ceramic slurry is not particularly limited, and for example, a method can be recited which comprises adding ceramic powder or organic solvent to the binder resin, mixing to homogeneity with the use of, e.g. a ball mill, and degassing. In a producing method of the present invention, then using the ceramic slurry, a ceramic green sheet is produced.

The film thickness of the ceramic green sheet is not particularly limited, and a preferred lower limit is 20 μm, and a preferred upper limit is 150 μm. If it is less than 20 μm, a break may occur in the ceramic green sheet, whereas if it exceeds 150 μm, the laminated laminate is too thick for practical use.

The method of producing the ceramic green sheet is not particularly limited, and a method can be exemplified which comprises flowing the ceramic slurry on a supporting face of a polyethylene terephthalate film or SUS plate processed for mold release by means of a doctor blade, reverse roll coater or the like, heating it to make volatile contents such as solvent vaporize, and removing it from the supporting face.

The ceramic green sheet may be formed with a through hole. Formation of a through-hole allows metal or the like to be pressure fitted to the through-hole, and provides application as a multilayered capacitor or the like. The metal is not particularly limited, and metals having high conductivity such as Cu, Ni, Ag, Au, and Al are preferably used. Since the burnt product produced by the present production method can be burnt at a temperature of 300° C. or less, it is possible to use Cu which is conventionally difficult to be used because of its susceptibility to oxidization.

In the present production method, a laminate is then produced.

The method of producing the laminate is not particularly limited, and for example, the a plurality of the ceramic green sheets are stacked and compressed. In the present production method, then the ceramic green sheet is burnt. Burning makes the binder resin or volatile resin decompose, and allows the ceramic green sheet to cure.

The burning method is not particularly limited, and for example, a method of conducting burning by elevating the temperature to 300° C. using a burning furnace such as electric muffle furnace can be exemplified.

The burning may be conducted in the atmosphere or in an anaerobic atmosphere such as in a reductive atmosphere.

In the burnt product obtained by the production method of the present invention, burning may be conducted at an extremely low temperature environment of 300° C. or less by using the binder resin, which is especially advantageous in terms of production time and product cost.

The binder resin composition of the present invention with the constitution as described above can be burnt at a relatively low temperature when it is used as a binder resin composition in production of various materials such as ceramic green sheet, conductive paste, PDP partition, dielectric layer, fluorescent layer and the like, and causes little stringiness upon printing. Application of the binder resin composition of the present invention is not limited to the above applications. Further, the binder resin composition of the present invention is preferably used for formation of a PDP partition based on a transfer method as one exemplary application thereof. That is, according to the present invention, even when PDP partition is formed by a transfer method, basic performances such as filling ability to recesses are satisfied. Further, by having a polyether component, excellent disappearance is achieved at relatively low temperature, and residues will not occur. Further, by having a cross-linkable function group at a side chain or an end, excellent moldability and transfer ability are exerted in formation of PDP partition by a transfer method.

Also a glass paste which comprises the binder resin composition of the present invention and glass powder dispersed in the binder resin composition is one aspect of the present invention.

Also a ceramic paste which comprises the binder resin composition of the present invention and ceramic powder dispersed in the binder resin composition is one aspect of the present invention.

Also a phosphor paste which comprises the binder resin composition of the present invention and phosphor or fluorescent powder dispersed in the binder resin composition is one aspect of the present invention.

Also a conductive paste which comprises the binder resin composition of the present invention and conductive powder dispersed in the binder resin composition is one aspect of the present invention.

Also a green sheet which comprises the binder resin composition of the present invention and glass powder or ceramic powder dispersed in the binder resin composition is one aspect of the present invention.

In the case of ceramic paste, it is possible to obtain a film formed of ceramic burnt product or a laminate burnt product by printing at least one layer of ceramic paste film by, e.g., screen printing, followed by burning. As the organic compound having three or more hydroxyl groups (OH groups) used in the present invention, for example, glycerin, diglycerin, trimethylol propane, penta erythritol, meth-erythritol, L-threitol, D-threitol, DL-threitol, 2-hydroxymethyl-1,3-propane diol, 1,1,1-trihydroxymethyl ethane, 1,2,4 butane triol, 1,2,6-hexane triol and the like can be exemplified.

The mixing amount of organic compound having three or more hydroxyl groups is 20-200 parts by weight, relative to 100 parts by weight of (meth)acrylate having a functional group capable of forming a hydrogen bond with a hydroxyl group. With this range, it is possible to provide a binder resin composition that causes little plate-leaving defect at the time of screen printing. Preferred is 30-150 parts by weight, and with this range, a binder resin composition which causes much little plate-leaving defect at the time of screen printing can be obtained.

As to the binder resin composition of the present invention, after preparing a mixture that contains 1 to 30 parts by weight of (meth)acrylic acid long-chain alkyl ester, and 20-200 parts by weight of organic compound having three or more hydroxyl groups, relative to 100 parts by weight of (meth)acrylate having a functional group capable of forming a hydrogen bond with a hydroxyl group, the (meth)acrylate in the mixture is (co) polymerized to produce a polymer.

The organic compound having three or more hydroxyl groups may be added after polymerization of (meth)acrylate, or may be present during polymerization to form the binder resin composition.

The content of the organic compound having three or more hydroxyl groups used in the present invention is 20-200 parts by weight, relative to 100 parts by weight of (meth)acrylate polymer having a functional group capable of forming a hydrogen bond with a hydroxyl group. With this range, it is possible to provide a binder resin composition exhibiting excellent screen printability, improved storage stability at elevated temperature, and reduced "stringiness" phenomenon, which little causes filiform paste on the surface of the printing plate. More preferably, the range is 30 to 150 parts by weight, and with this range, it is possible to provide a binder resin composition exhibiting excellent screen printability, improved storage stability at elevated temperature, reduced "stringiness" phenomenon and suppressed occurrence of "filiform dusts".

Further, the binder resin composition according to the present invention preferably has a Haze value of 20 or more calculated from the total light transmittance when it is formed into a thin film of 5 mm in thickness.

Haze value can be determined by measuring a dry sheet obtained from paste with the use of a Haze meter.

The binder resin composition according to the present invention preferably contains a nonionic surfactant. In particular, in a specific aspect of the present invention, there is provided a binder resin composition containing preferably 0.01-10 parts by weight of nonionic surfactant, relative to 100 parts by weight of copolymer (A). More preferably, copolymer (A) has a functional group capable of forming a hydrogen bond.

Examples of the nonionic surfactant include, but are not limited to, polyoxyethylene decyl ether, polyoxyethylene lauryl ether, polyoxyethylene olyl ether, polyoxyethylene isodecyl ether and the like.

As a result, the present invention provides a binder resin composition having excellent screen printability, improved storage stability at elevated temperature, reduced "stringiness" phenomenon, and capable of preventing occurrence of "filiform dusts" which are scattering paste hanging down in filaments from screen printing plate.

In other specific aspect of the present invention, copolymer (A) is preferably a polymer containing (meth) acrylic acid long-chain alkyl ester. The (meth)acrylic acid long-chain alkyl ester occupying in 100% by weight of copolymer (A) is preferably 1 to 30% by weight. In other words, copolymer (A) can be obtained preferably by mixing 100 parts by weight of (meth)acrylate having a functional group capable of forming a hydrogen bond with a hydroxyl group, with 1 to 30 parts by weight of (meth) acrylic acid long-chain alkyl ester and 20-200 parts by weight of organic compound having three or more hydroxyl groups, and then polymerizing the (meth) acrylate.

As a result, it is possible to provide an acrylic binder resin composition which little causes plate leaving defect in screen printing and which can be burnt at low temperature.

More preferably, the polymer (A) is preferably copolymer (A2) having a functional group capable of forming a hydrogen bond with a hydroxyl group. This is desirable because thixotropic nature is expressed satisfactorily.

The ratio of copolymerization of the (meth) acrylic acid long-chain alkyl ester monomer used in the present invention is preferably selected so that the ratio of (meth) acrylic acid long-chain alkyl ester occupying in 100% by weight of the polymer (A) (preferably, polymer (A2)) is 1-30% by weight because too small ratio impairs plate leaving property and too large amount causes reduction in screen printability.

Preferably, the (meth)acrylic acid long-chain alkyl ester is (meth) acrylic acid long-chain alkyl ester having 8 or more carbons, and as a result, it is possible to provide a binder which little causes plate leaving defect in screen continuous printing. Preferred examples of the (meth) acrylic acid ester monomer having a long-chain alkyl chain having 8 or more carbons include, but are not limited to, 2-ethylhexylmethacrylate, octyl methacrylate, stearyl methacrylate, isomyristyl methacrylate, and dodecyl methacrylate, behenyl methacrylate.

In the present invention, it is preferred to produce a binder resin composition by adding 100 parts by weight or less of organic solvent to 100 parts by weight of solids. The term solids used herein mean polymer components other than organic solvent.

Preferably, 500 parts by weight or less, more preferably 100 parts by weight or less of organic solvent having boiling point of 150° C. or higher is contained. More preferably, it is 300 parts by weight or less, more preferably 100 parts by weight or less, and further preferably 30-80 parts by weight. This makes it easier to adjust the viscosity to that required for screen printing and the like.

In the binder resin composition of the present invention, preferably, organic solvent (C) having billing point of 150° C. or higher is contained in an amount of 500 parts by weight or less, more preferably 300 parts by weight or less, further preferably 100 parts by weight or less, still further preferably 30-80 parts by weight, relative to 100 parts by weight of copolymer (A) having a functional group capable of forming a hydrogen bond with a hydroxyl group.

The binder resin composition may contain an organic solvent. The organic solvent preferably has boiling point of 150° C. or higher from the view point of stability of solids and viscosity stability in printing. Examples of such an organic solvent include, but are not limited to, terpineol, ethylene glycol ethyl ether, ethylene glycol monobutyl ether, ethylene glycol monoethyl ether acetate, butyl carbitol, butyl carbitol acetate, isoforon, butyl lactate, dioctyl phthalate, dioctyl adipate, benzyl alcohol, phenyl propylene glycol, and cresol. Among these solvents, a solvent lacking an aromatic ring which little leave an organic residue is preferred.

According to the present invention, it is possible to provide a low-temperature decomposable binder resin composition, glass paste, ceramic paste, fluorescent paste, conductive paste, and green sheet capable of disappearing without leaving any residues upon burning at relatively low temperature. Also, a paste that little causes "stringiness" upon printing is obtained.

In the case of a binder resin composition containing polymer which is obtained by polymerizing (meth)acrylate in a mixture of 100 parts by weight of copolymer (A) having a functional group capable of forming a hydrogen bond with a hydroxyl group, 1-30 parts by weight of (meth)acrylic acid long-chain alkyl ester and 20-200 parts by weight of organic compound having three or more hydroxyl groups, it is possible to provide an acrylic low-temperature burnable binder which has excellent screen printability and cause little plate leaving defect, especially in continuous printing of screen printing.

In the present invention, when 100 parts by weight of copolymer (A) having a functional group capable of forming a hydrogen bond with a hydroxyl group, 20-200 parts by weight of organic compound having three or more hydroxyl groups and 0.01-10 parts by weight of nonionic surfactant are contained, screen printability is improved, storage stability at elevated temperature is improved, "stringiness" becomes difficult to occur, and "filiform dusts" becomes difficult to occur.

(One Example of Preferred Application of the Present Invention)

By way of example, a production method of a glass substrate for plasma display panel using the binder resin composition of the present invention will be explained. In this case, as copolymer (A), the one having a cross-linkable function group at its side chain or at its end will be used. FIG. 2 is a schematic view showing the overview of the production method of a glass substrate for plasma display panel using the binder resin composition of the present invention.

In the production method of a glass substrate for plasma display panel of the present embodiment, first, a step of filling a recess of a frame in which a predetermined pattern of recess is formed, with the binder resin composition in which glass powder is dispersed (hereinafter, also referred to as Step 1) is conducted. By using the binder resin composition of the present invention, it is possible to realize excellent filling property to the frame, sufficiently keep the form of molded product until burning, and prevent residues from the binder resin from occurring in the burning step.

The recess of the frame is formed into such a pattern that the recess is positioned in the middle part between the electrodes on the glass substrate in correspondence with the interval between the electrodes formed (or to be formed) on the glass substrate.

The width and interval of the recesses in the frame differ depending on the PDP screen size to be created and number of pixels, however, the width of recess is usually about 20 to 100 μm, and the interval of recesses is usually about 50 to 300 μm.

Further, the depth of the recess of the frame corresponds to the height of partition to be formed, and is usually about 100 to 300 μm.

The glass powder is burnt in the step as described later to form a partition integrally with the substrate. Examples of the glass powder include, but are not limited to, lead borosilicate glass, lead glass, $CaO\ Al_2O_3.SiO_2$-based inorganic glass, $MgO.Al_2O_3.SiO_2$-based inorganic glass, and $Li_2O.Al_2O_3.SiO_2$-based inorganic glass and the like low melting point glasses. Further, a preferred lower limit of the particle size of the glass powder is 0.1 μm, and preferred upper limit is 10 μm. When it is less than 0.1 μm, it may become difficult to make it adequately disperse in the low-temperature burning resin composition of copolymer (A), whereas when it exceeds 10 μm, the accuracy of a formed partition will be impaired.

The blending ration between the binder resin composition of the present invention and glass powder may be appropriately selected depending on the kinds of used binder resin composition and glass powder, and a preferred lower limit of the blending ratio of the binder resin composition of the present invention, relative to 100 parts by weight of glass powder is 1 part by weight, and preferred upper limit is 20 parts by weight. When it is less than 1 part by weight, the binder resin composition of the present invention may fail to play an adequate roll of binder, whereas when it exceeds 20 parts by weight, a partition may not be formed or a formed partition has poor accuracy.

In the step 1, the binder resin composition of the present invention into which glass powder is dispersed is filled into the recess of the frame (FIG. 2a). As to the filling amount, it is preferred to fill over the edge of the recess to ensure that the binder resin composition of the present invention containing glass powder comes into contact with the glass substrate when the glass substrate is stacked after filling, and filling may be made to such an extent that the binder resin composition of the present invention containing glass powder overflow the recess and extends a thin film on the surface of the frame. When the binder resin composition of the present invention containing glass powder is filled up to the edge of the recess (FIG. 2b1), a glass substrate having a partition in which the partition is directly formed in the glass substrate (FIG. 2f1) is obtained, while when the binder resin composition of the present invention containing glass powder is filled over the recess (FIG. 2b2), a glass substrate having partition in which the partition is formed on the glass substrate while intervened by a thin film (FIG. 2f2) can be obtained.

In the production method of a glass substrate for plasma display panel of the present embodiment, then a step of stacking the frame filled with the binder resin composition of the present invention containing glass powder and a glass substrate to obtain a laminate (hereinafter, also referred to as Step 2) is conducted. The obtained laminate is shown in FIG. 2c1 and FIG. 2c2. When an electrode is formed in advance on the glass substrate, care should be taken to position the electrode between recesses of the frame at the time of stacking.

In the production method of a glass substrate for plasma display panel of the present embodiment, then a step of allowing the binder resin composition of the present invention containing glass powder to cure by applying stimulation to the laminate obtained in Step 2 for curing the binder resin composition of the present invention, thereby curing the binder resin composition of the present invention containing glass powder (hereinafter, also referred to as Step 3) is conducted. In this embodiment, since copolymer (A) contained in the binder resin composition of the present invention has a cross-linkable function group that causes a cross-linking reaction upon light irradiation and/or heating, it can be readily cured upon light irradiation and/or heating (FIG. 2d1 and FIG. 2d2).

In the production method of a glass substrate for plasma display panel according to the present embodiment, then a step of removing the frame from the laminate and obtaining a molded product in which a partition precursor formed of the binder resin composition of the present invention containing glass powder cured on the substrate (hereinafter, also referred to as Step 4) is conducted.

In Step 3, by curing the binder resin composition of the present invention containing glass powder, the cured binder resin composition of the present invention containing glass powder is adhered to the glass substrate, and is somewhat shrank due to the curing, so that it can be removed from the frame very easily. Further, since the cured substance has a sufficient strength, it will not be deformed or get chipped at the time of removal of frame.

In this manner, on the glass substrate, a partition precursor corresponding to the form and size of recess of the frame is formed that will form a partition upon burning in a step as will be described later (FIG. 2e1 and FIG. 2e2).

In the production method of a glass substrate for plasma display panel according to the present embodiment, then a step of burning the molded product obtained in Step 4 to make the binder resin composition of the present invention disappear, and integrating the glass powder and the glass substrate to form a partition (hereinafter, also referred to Step 5) is conducted.

The above burning is conducted in such a condition that the binder resin composition of the present invention is completely removed, and the glass powder is burned and the glass substrate will not be warped or deformed. In the production method of a glass substrate for plasma display panel according to the present embodiment, since the binder resin composition of the present invention is used as a binder, it is possible to securely remove the binder without leaving any residues upon heating at relatively low temperature in short time. Further, when burning is conducted in an atmosphere where oxygen concentration is extremely high, it is possible to completely remove the binder at lower temperature and in shorter time. Through Step 5, a partition integrated on the glass substrate is formed (FIG. 2f1 and FIG. 2f2).

In the production method of a glass substrate for plasma display panel according to the present embodiment, by using the binder resin composition of the present invention, it is possible to produce a glass substrate having a partition of high form accuracy without deformation of chipping by an extremely facilitated and simplified process. Further, since burning is conducted at relatively low temperature in short time, a skew will not occur in the glass substrate and it will not require a long time for gradual cooling.

BRIEF DESCRIPTION OF THE DRAWINGS

FIG. 1 is a schematic view of the binding form between segments in the unit (A) used in the binder resin composition of the present invention.

FIG. 2 is a schematic view showing one exemplary overview of the production method of a glass substrate for plasma display panel using the binder resin composition of the present invention.

FIG. 3 is a schematic view of the binding form between segments in a binder resin.

EXPLANATION OF REFERENCE NUMERAL

1 . . . frame
2 . . . heat disappearing curative resin composition containing glass powder
3 . . . glass substrate
4 . . . partition precursor
5 . . . partition

BEST MODE FOR CARRYING OUT THE INVENTION

The present invention will be explained in more detail by way of examples, however it is to be noted that the present invention is not limited to these examples.

Synthesis Example 1

To a 0.5 L separable flask equipped with a stirrer, a cooler, a thermometer and a nitrogen gas inlet, 100 g of 2-ethylhexyl acrylate, 3 g of lauryl mercaptan (Wako Pure Chemical Industries, Ltd.) and 100 g of ethyl acetate were introduced and mixed to obtain a monomer mixture solution. The resultant monomer mixture solution was bubbled with nitrogen gas for 20 minutes to remove dissolved oxygen, and then the interior of the separable flask system was substituted by nitrogen gas, and the temperature was raised until reflux is achieved under stirring. After reflux, a solution of 0.024 g of 1,1-di(t-hexylperoxy)-3,3,5-trimethylcyclohexane serving as a polymerization initiator diluted in 1 g of ethyl acetate was added to the polymerization system. After an hour, a solution of 0.036 g of 1,1-di(t-hexylperoxy)-3,3,5-trimethylcyclohexane diluted in 1 g of ethyl acetate was added. Then after 2, 3 and 4 hours from start of polymerization, a solution of 0.048 g di(3,5,5-trimethylhexanoyl)peroxide diluted in 1 g of ethyl acetate was added. After 7 hours from the first addition of polymerization initiator, the system was cooled to room temperature to stop the polymerization. As a result, a solution of 2-ethylhexylacrylate oligomer in ethyl acetate was obtained.

Analysis of the obtained oligomer by gel permeation chromatography demonstrated that the number average molecular weight in terms of polystyrene was about 5000.

Synthesis Example 2

In a 0.5 L separable flask, 0.1 mol of tripropylene glycol and 0.1 mol of methacrylic anhydride were mixed in anhydrous tetrahydrofuran. After stirring the mixture for a while, the internal pressure of the container was reduced to volatile the content and the material was distilled off to obtain tripropylene glycol monomethacrylate.

Synthesis Example 3

Polypropylene glycol monomethacrylate was obtained in a similar manner as Synthesis example 2 except that the tripropylene glycol in Synthesis example 2 was replaced by polypropylene glycol having a polymerization degree of 7.

Example 1

As shown in Table 1, to a 0.5 L separable flask equipped with a stirrer, a cooler, a thermometer and a nitrogen gas inlet, 95 g of methylmethacrylate (Nippon Syokubai Co., Ltd.), 5 g of polypropylene glycol monomethacrylate (NOF Corporation, BLENMER PP-1000), 1 g of lauryl mercaptan (Wako Pure Chemical Industries, Ltd.) and 100 g of ethyl acetate were added and mixed to obtain a monomer mixture solution. The resultant monomer mixture solution was bubbled with nitrogen gas for 20 minutes to remove dissolved oxygen, and then the interior of the separable flask system was substituted by nitrogen gas, and the temperature was raised until reflux is achieved under stirring. After reflux, a solution of 0.024 g of 1,1-di(t-hexylperoxy)-3,3,5-trimethylcyclohexane serving as a polymerization initiator diluted in 1 g of ethyl acetate was added to the polymerization system. After an hour, a solution of 0.036 g of 1,1-di(t-hexylperoxy)-3,3,5-trimethylcyclohexane diluted in 1 g of ethyl acetate was added. Then after 2, 3 and 4 hours from start of polymerization, a solution of 0.048 g di(3,5,5-trimethylhexanoyl)peroxide diluted in 1 g of ethyl acetate was added. After 7 hours from the first addition of polymerization initiator, the system was cooled to room temperature to stop the polymerization. As a result, a solution of copolymer (A) having a polyalkylene oxide side chain in ethyl acetate was obtained.

Analysis of the obtained copolymer (A) by gel permeation chromatography demonstrated that the number average molecular weight in terms of polystyrene was about 30,000.

After removing ethyl acetate in a rotary evaporator, terpineol (YASUHARA CHEMICAL CO., LTD, Terpineol) was added in a blending ratio shown in Table 2 and dissolved. The obtained solution was mixed with glass powder (Tokan Material Technology Co., Ltd., ABX169F=melting point 464° C., particle size 2.5 μm) in a blending ratio shown in Table 2 with the use of a three-roll mill, to prepare a glass paste.

Examples 2-46, and Examples 56-77, Comparative Examples 1, 2, 4-7, 9-21

In Examples 2-77 and Comparative examples 1-21, Example 1 was followed except for the contents shown in Tables 1 to 26 below. To be more specific, copolymer (A) was prepared in accordance with each monomer composition, and in Examples 2-29 and Examples 34-36, Examples 45, 46, and 56-77, glass powder was mixed in a blending ratio shown in Tables below to prepare a glass paste. On the other hand, in Examples 31, 38 and 42, fluorescent particles ($BaMgAl_{10}O_{17}$: Eu, Nichia Corporation) were mixed in place of the glass powder, to prepare a fluorescent paste. Further, in Examples 32, 39 and 43, likewise the above, nickel particles (Aldrich, average particle size 3 μm) in place of glass powder were mixed to prepare a nickel paste. Further, in Examples 30, 37 and 41, likewise the above, alumina particles (Wako Pure Chemical Industries, Ltd., average particle size 1 μm) in place of glass powder were mixed to prepare a ceramic paste. Further, in Examples 33, 40 and 44, likewise the above, silver powder (Wako Pure Chemical Industries, Ltd., average particle size 1 μm) in place of glass powder was mixed to prepare a conductive paste. For mixing, a three-roll mill was used. In a similar manner, pastes having compositions shown in Comparative examples 1, 2, 4-7, and 9-21 were obtained.

Comparative Example 3

10% ethyl cellulose from Aldrich (ethoxy content: 48%) solution in terpineol was prepared and mixed with glass powder in a blending ratio shown in Table 1 to give a glass paste.

(Evaluation)

Glass pastes, fluorescent pastes, conductive pastes and the like pastes prepared in Examples 1-46, and Examples 56-77 and Comparative examples 1, 2, 4-7, 9-21 were evaluated in the following manner. The evaluation results are shown in Tables 1-26.

(1) Evaluation of "Stringiness" Property

A glass plate on which two 350 μm spacers are placed in parallel at an interval of 100 mm was prepared. An obtained glass paste was applied between the spacers in an excessive manner, and the coating was extended with the use of a scraper, and presence/absence of "stringiness" in an end part of the coating was visually checked.

(2) Measurement of 95% Decomposition Temperature

Using TGA/DTA (TA Instruments), measurement was conducted in an air atmosphere at a rate of temperature elevation of 10° C./min., and changes in temperature and weight of the binder resin composition were determined. The temperature at which the initial weight was reduced by 95% was reported as 95% decomposition temperature. The temperature at which the initial weight was reduced by 99% was reported as 99% decomposition temperature. Also measurement was conducted while the rate of temperature elevation was changed to 30° C./min., and the temperature at which the initial weight was reduced by 95% was reported as 95% decomposition temperature.

(3) Evaluation of Presence/Absence of Blackening

On a glass plate, a glass paste was applied in a thickness of 350 μm, and dried at 150° C. for 10 minutes, and after conducting degreasing of resin at 450° C. for 5 min. using an electric muffle furnace (ADVANTEC, FUW230PA), a degree of blackening was visually checked.

(4) Evaluation of Presence/Absence of Tacking

On a glass plate, a glass paste was applied in a thickness of 350 μm, dried at 150° C. for 10 minutes, and cooled to room temperature, and then tacking was checked by finger tack.

(5) Measurement of Moisture Content

Using a Carl Fischer moisture meter, a moisture content in a paste after a lapse of 7 days at room temperature from preparation of the paste was measured.

(6) Measurement of Solvent Content

Preparation of Paste Used for Measurement

A paste was poured into a frame forming an enclosure on a glass plate at a height of 1 mm, and left still for 6 hours, and presence of skinning was checked. Then 0.5 g of a paste removed from the frame was weighed on an aluminum dish, and a reduced weight of paste was measured after heating for 15 minutes in an oven at 150° C.

The pastes obtained in Examples 28-32, and Comparative examples 9-12 were evaluated for viscosity ratio and plate leaving property according to the following evaluation methods.

(7) Screen Printability (Viscosity Ratio)

A viscosity ratio (viscosity at 30 rpm/viscosity at 5 rpm) of obtained glass paste was determined from measurement results of viscosity at room temperature when rotation speeds are set 5 rpm and 30 rpm using a B-type viscometer. When the viscosity ratio is 1.5 or more, it is determined that screen printability is good.

Good: not less than 1.5
Not good: less than 1.5

(8) Plate Leaving Property

A printed matter having experienced 1000 times continuous screen printing was sensory evaluated for likelihood of leaving from plate of printed screen.

○: smoothly leaving from plate
Δ: not smoothly leaving from plate

As to Examples 61-68, and Comparative examples 13-16, screen printability and storage stability were evaluated in the following manners.

1) Screen Printability (Viscosity Ratio)

Viscosities of the obtained glass paste were measured using a B-type viscometer at room temperature at rotation speeds of 5 rpm and 30 rpm. From the obtained viscosities, viscosity ratio (viscosity at 30 rpm/viscosity at 5 rpm) were determined. When the viscosity ratio is 1.5 or more, it is determined that screen printability is good.

Viscosity ratio of not less than 1.5: good screen printability
Viscosity ratio of less than: not good screen printability 2) Storage Stability Whether a phase separation occurs in a solution was sensory evaluated by visually check after storage the obtained binder resin composition for two months at 50° C., ○: no phase separation observed
Δ: some phase separation observed
X: complete phase separation observed As to Examples 69-77, and Comparative examples 17-22, low-temperature decomposability, screen printability, presence/absence of occurrence of filiform dusts, solution stability and Haze value were evaluated.

1) Low-Temperature Decomposability

Using TGA/DTA (TA Instruments), the obtained glass paste was measured in an air atmosphere at a rate of temperature elevation of 10° C./min., and changes in temperature and weight were determined. The temperature at which the initial weight was reduced by 99.5% was reported as 99.5% decomposition temperature, and evaluated in such a manner that the temperature less than 400° C. was ○, and the temperature not less than 400° C. was X.

2) Screen Printability

Viscosity of the glass paste obtained above was measured by a B-type viscometer at different rotation speeds. From the ratio at room temperature between viscosities (thixotropic ratio) measured at rotation speed of 5 rpm and at rotation speed of 30 rpm, screen printability represented by easiness of passage through screen mesh (high speed and low viscosity), plate leaving, and liquid dripping (low speed and high viscosity) was evaluated. Here, the viscosity ratio of 1.5 or more was evaluated as X.

3) Presence/Absence of Filiform Dusts

A glass plate on which two 350 μm spacers are placed in parallel at an interval of 100 mm was prepared. The glass paste obtained above was applied between the spacers in an excessive manner, and whether fine filiform dusts occurred when the coating was extended with the use of a scraper at a speed of 3 m/min. was examined. Here, when no filiform dusts occurred, it was evaluated as ○, and when filiform dusts occurred, it was evaluated as X.

4) Solution Stability

After storing the vehicle solution obtained in the above at room temperature for four weeks, whether phase separation occurred in the solution was visually checked. When no phase separation occurs, it was evaluated as ○, and when phase separation occurs, it was evaluated as X.

5) Haze Value

The vehicle obtained above was formed into a thin film having a thickness of 5 mm, and Haze value was measured using a Haze meter (TC-HIIIDPK) manufactured by Tokyo Denshoku Co. Ltd. according to the following formula.

Haze value=$Td/Tt$

Here, Tt represents total light transmission (%) and Td represents diffusion transmission (%).

Excellent evaluation was obtained for the blending ranges of Examples 56-60, namely 1-30 parts by weight of stearyl methacrylate (SMA) which is (meth) acrylic acid long-chain alkyl ester. To the contrary, in Comparative example 9, plate leaving property is poor because SMA is not copolymerized. In Comparative example 10, plate leaving property is poor because the amount of SMA is small. In Comparative example 11, the viscosity ratio decreases and screen printability is impaired because the amount of SMA is large. In Comparative example 11, 12, the viscosity decreases and the screen printability is impaired because the amount of SMA is large.

Examples 61-68 in which 0.01-10 parts by weight of polyoxyethylenes was added as a nonionic surfactant were excellent in any evaluation. On the other hand, Comparative example 13 resulted in phase separation and deterioration in screen printability because no nonionic surfactant (polyoxyethylenes) was added. Comparative example 14 resulted in phase separation and deterioration in screen printability because the amount of nonionic surfactant was small. Comparative example 15 resulted in decrease in viscosity ratio and deterioration in screen printability because the amount of nonionic surfactant was large. Comparative example 16 resulted in decrease in viscosity ratio and deterioration in screen printability because the amount of nonionic surfactant was large.

Example 47

(1) Preparation of Cross-Linking Binder Resin

To a 0.5 L separable flask equipped with a stirrer, a cooler, a thermometer and a nitrogen gas inlet, 92 g of isobutylmethacrylate (product of Nippon Syokubai Co., Ltd.), 5 g of polypropylene glycol monomethacrylate (NOF Corporation, Blenmer PP-1000), 3 g of 3-methacryloyloxypropyl trimethoxy silane, 3 g of lauryl mercaptan (Wako Pure Chemical Industries, Ltd.) and 100 g of ethyl acetate were charged and mixed, to prepare a monomer mixture solution. The resultant monomer mixture solution was bubbled with nitrogen gas for 20 minutes to remove dissolved oxygen, and then the interior of the separable flask system was substituted by nitrogen gas, and the temperature was raised until reflux is achieved under stirring. After reflux, a solution of 0.024 g of 1,1-di(t-hexylperoxy)-3,3,5-trimethylcyclohexane serving as a polymerization initiator diluted in 1 g of ethyl acetate was added to the polymerization system. After an hour, a solution of 0.036 g of 1,1-di(t-hexylperoxy)-3,3,5-trimethylcyclohexane diluted in 1 g of ethyl acetate was added. Then after 2, 3 and 4 hours from start of polymerization, a solution of 0.048 g di(3,5,5-trimethylhexanoyl)peroxide diluted in 1 g of ethyl acetate was added. After 7 hours from the first addition of polymerization initiator, the system was cooled to room temperature to stop the polymerization. As a result, a solution of copolymer (A) having a polyalkylene oxide side chain in ethyl acetate was obtained.

Analysis of the obtained copolymer (A) by gel permeation chromatography demonstrated that the number average molecular weight in terms of polystyrene was about 6000.

After adding 50 g of polypropylene glycol (Asahi Glass Co., Ltd., EXCENOL 3020) to the obtained solution of copolymer (A) in ethyl acetate, ethyl acetate was removed by a rotary evaporator, to obtain a liquid curative binder resin.

(2) Preparation of Glass Paste

To 100 parts by weight of the obtained liquid curative binder resin, was added 3 parts by weight of diacylphosphine oxide compound (Ciba Specialty Chemicals, IRGACURE 819), heated to 50° C. under light shielding, and mixed to homogeneity using a stirring bar, to obtain a binder resin composition in paste form. To 25 parts by weight of the obtained paste binder resin composition, 75 parts by weight of glass powder (Tokan Material Technology Co., Ltd., ABX169F=melting point 464° C., particle size 2.5 μm) was mixed, and glass powder was adequately dispersed by a ball mill, to prepare a glass paste.

(3) Production of Glass Substrate for Plasma Display

A frame in which a plurality of recesses each having a width of 50 μm and a depth of 150 μm are formed at intervals 160 μm on the surface of a plate-like member formed of silicone rubber was prepared. The recesses of the frame were filled with the obtained glass paste such that the paste overflow the recesses to spread a thin film on the surface of the frame. Then a glass substrate was overlaid thereon to create a laminate. Then from the side of the glass substrate, UV ray of 365 nm was emitted for 60 seconds while illumination was adjusted such that the irradiation strength was 10 mW/cm$^2$ using a high-pressure mercury lamp. Irradiation with UV ray was followed by curing for 30 minutes at 80° C.

After curing the glass substrate was slowly held up, and it easily left the frame, and a molded product in which partition precursor of glass containing heat disappearable curative resin composition cured on the glass-substrate was obtained. The molded product was degreased for 10 minutes at 260° C. and then burnt for 5 minutes at 460° C. As a result, the heat disappearable resin composition completely disappeared, and a partition having extremely high shape accuracy and free of deformation or chipping was formed on the glass substrate.

Example 48

A binder resin composition in a paste form was obtained similarly to Example 47 except that 2 parts by weight of cumene hydroxy peroxide was added as a decomposition accelerator. A glass paste was prepared and a glass substrate for plasma display panel was produced in a similar manner as described in Example 17 except that the obtained binder resin composition was used. The obtained partition included no deformation and chippings and had extremely high form accuracy.

Example 49

A binder resin composition in a paste form was obtained similarly to Example 47 except that 2 parts by weight of azo bis isobutylonitrile (AIBN) was added as a decomposition accelerator. A glass paste was prepared and a glass substrate for plasma display panel was produced in a similar manner as described in Example 17 except that the obtained binder resin composition was used. The obtained partition included no deformation and chippings and had extremely high form accuracy.

Example 50

A binder resin composition in a paste form was obtained similarly to Example 47 except that 4 parts by weight of tin oxide was added as a decomposition accelerator.

A glass paste was prepared and a glass substrate for plasma display panel was produced in a similar manner as described in Example 47 except that the obtained binder resin composition was used. The obtained partition included no deformation and chippings and had extremely high form accuracy.

Example 51

A binder resin composition in a paste form was obtained similarly to Example 47 except that 3 parts by weight of dodecyl mercaptan was added as a decomposition retardant.

A glass paste was prepared and a glass substrate for plasma display panel was produced in a similar manner as described in Example 47 except that the obtained binder resin composition was used. The obtained partition included no deformation and chippings and had extremely high form accuracy.

Example 52

A binder resin composition in a paste form was obtained similarly to Example 47 except that 2 parts by weight of 1,6-hexamethylenediamine was added as a decomposition retardant.

A glass paste was prepared and a glass substrate for plasma display panel was produced in a similar manner as described in Example 47 except that the obtained binder resin composition was used. The obtained partition included no deformation and chippings and had extremely high form accuracy.

Example 53

A binder resin composition in a paste form was obtained similarly to Example 47 except that 2 parts by weight of dibutyl tin dilaurate was added as a decomposition retardant.

A glass paste was prepared and a glass substrate for plasma display panel was produced in a similar manner as described in Example 47 except that the obtained binder resin composition was used. The obtained partition included no deformation and chippings and had extremely high form accuracy.

Example 54

A binder resin composition in a paste form was obtained similarly to Example 47 except that 3 parts by weight of tributyl borate was added as a decomposition retardant.

A glass paste was prepared and a glass substrate for plasma display panel was produced in a similar manner as described in Example 47 except that the obtained binder resin composition was used. The obtained partition included no deformation and chippings and had extremely high form accuracy.

Comparative Example 8

In a 0.2 L beaker, 100 parts by weight of 25% solution of polyvinyl butyral (Sekisui Chemical Co., Ltd.) in toluene was mixed with 75 parts by weight of lead borosilicate glass powder (Tokan Material Technology Co., Ltd., ABX169F=melting point 464° C., particle size 2.5 μm) to homogeneity by using a stirring bar to prepare a glass paste.

A frame in which a plurality of recesses each having a width of 50 μm and a depth of 150 μm are formed at intervals 160 μm on the surface of a plate-like member formed of silicone rubber was prepared. The recesses of the frame were filled with the obtained glass paste such that the paste overflow the recesses to spread a thin film on the surface of the frame. Then a glass substrate was overlaid thereon to create a lamination. The glass substrate was slowly held up, and the glass paste remained in part of recess and didn't follow the glass substrate. Next, the obtained molded product was maintained at 400° C. for 20 minutes to remove the resin and then burnt at 460° C. for 5 minutes. As a result, the resin composition disappeared and a partition was obtained, however, a part of partition fell sidelong and deformation and chippings were microscopically observed in a part of the partition. Also skew was observed in a part of the glass substrate.

Example 55

To a 0.5 L separable flask equipped with a stirrer, a cooler, a thermometer and a nitrogen gas inlet, 95 g of isobutyl methacrylate (Nippon Shokubai Co., Ltd.), 5 g of polypropylene glycol monomethacrylate (NOF Corporation, BLENMER PP-500), 1 g of lauryl mercaptan(Wako Pure Chemical Industries, Ltd.) and 100 g of ethyl acetate were charged and mixed, to prepare a monomer mixture solution.

The resultant monomer mixture solution was bubbled with nitrogen gas for 20 minutes to remove dissolved oxygen, and then the interior of the separable flask system was substituted by nitrogen gas, and the temperature was raised until reflux is achieved under stirring.

After reflux, a solution of 0.024 g of 1,1-di(t-hexylperoxy)-3,3,5-trimethylcyclohexane serving as a polymerization initiator diluted in 1 g of ethyl acetate was added to the polymerization system. After an hour, a solution of 0.036 g of 1,1-di(t-hexylperoxy)-3,3,5-trimethylcyclohexane diluted in 1 g of ethyl acetate was added. Then after 2, 3 and 4 hours from start of polymerization, a solution of 0.048 g di(3,5,5-trimethylhexanoyl)peroxide diluted in 1 g of ethyl acetate was added. After 7 hours from the first addition of polymerization initiator, the system was cooled to room temperature to stop the polymerization. As a result, a solution of binder resin having a polyether side chain in ethyl acetate was obtained.

Analysis of the obtained binder resin by gel permeation chromatography demonstrated that the number average molecular weight in terms of polystyrene was about 30,000.

Ethyl acetate was removed from the solution of the obtained binder resin in ethyl acetate by a rotary evaporator, and then terpineol (YASUHARA CHEMICAL CO., LTD, Terpineol) was added and dissolved. The obtained solution was then added with 15% by weight of mixture of CaO—$Al_2O_3$—$SiO_2$—$B_2O_3$ and $Al_2O_3$ as ceramic powder, relative to the total solution, mingled with a three-roll mill, and mixed for 48 hours with a ball mill, to prepare a ceramic slurry.

The obtained ceramic slurry was applied on a polyester film processed for mold release so that the thickness after drying was about 5 μm, air-dried for an hour at room temperature, and dried in a hot-air drier for 3 hours at 80° C. and for 2 hours at 120° C., to give a ceramic green sheet. The ceramic green sheet was cut into 5-cm square pieces, and 100 of the pieces on which a conductive paste for screen printing is screen-printed were stacked, and pressure bonded under a pressure bonding condition of temperature of 70° C. and pressure of 150 kg/cm², 10 minutes, to give a laminate of ceramic green sheets. The temperature of the obtained ceramic green sheet laminate was elevated to 300° C. at a rate of temperature elevation of 10° C./min. to give a ceramic burnt product.

(Evaluation)

The ceramic burnt product obtained in Example 55 was evaluated for "stringiness" and 95% decomposition temperature in a similar manner as described in Example 1. As a result, "stringiness" was not visually observed, and 95% decomposition temperature was 300° C.

TABLE 1

|  |  | Examples | | | | | | | | |
|---|---|---|---|---|---|---|---|---|---|---|
|  |  | 1 | 2 | 3 | 4 | 5 | 6 | 7 | 8 | 9 |
| Monomer Composition | Methyl Methacrylate | 95 | | | | | | | | |
|  | Isobutyl Methacrylate | | 95 | | 90 | 80 | 80 | 60 | 80 | 80 |
|  | Stearyl Methacrylate | | | 95 | | | | | | |
|  | Polypropylene Glycol Monomethacrylate, Trade Name "BLENMER PP-1000", Polymerization Degree 16, Supplied by NOF Corporation | 5 | 5 | 5 | 10 | 20 | 20 | 40 | | |
|  | Polypropylene Glycol Monomethacrylate, Trade Name "BLENMER PP-500", Polymerization Degree 9, Supplied by NOF Corporation | | | | | | | | 20 | |
|  | Polypropylene Glycol Monomethacrylate, Trade Name "BLENMER PP-800", Polymerization Degree 13, Supplied by NOF Corporation | | | | | | | | | 20 |
| Chain Transfer Agent | Lauryl Mercaptan | 1 | 1 | 1 | 1 | 1 | 1 | 1 | 1 | 1 |
| Polymerization Solvent | Ethyl Acetate | 100 | 100 | 100 | 100 | 100 | 100 | 100 | 100 | 100 |
| Number Average Molecular Weight (Mn) (×1000) | | 3 | 3.5 | 3.2 | 3.4 | 3.6 | 3.6 | 3.3 | 3.5 | 3.4 |

TABLE 2

|  |  | Examples | | | | | | | | |
|---|---|---|---|---|---|---|---|---|---|---|
|  |  | 1 | 2 | 3 | 4 | 5 | 6 | 7 | 8 | 9 |
| Additive | Polypropylene Glycol (Number Average Molecular Weight 3000), Trade Name "EXCENOL 3020", Supplied by Asahi Glass Co., Ltd. | | | | | | | | | |
|  | Polypropylene Glycol (Number Average Molecular Weight 10000), Trade Name "PREMINOL 4011", Supplied by Asahi Glass Co., Ltd. | | | | | | | | | |
|  | Polytetramethylene Glycol (Number Average Molecular Weight 1000), Trade Name "PTMG 1000", Supplied by Mitsubishi Chemical Corporation. | | | | | | | | | |
|  | 2-ethylhexyl Acrylate Oligomer (Number Average Molecular Weight 5000), Synthesis Example 1 | | | | | | | | | |
|  | Ethyl Cellulose | | | | | | | | | |
| Decomposition Accelerator | Cumen Hydroxy Peroxide | | | | | | | | | |
|  | t-Butanol Peroxide | | | | | | | | | |
|  | Azobis Isobutyronitrile | | | | | | | | | |
|  | Lead Oxide | | | | | | | | | |
|  | Dodecyl Mercaptan | | | | | | | | | |
|  | 1,6-Hexane Methylene Diamine | | | | | | | | | |
|  | Dibutyl Lead Laurate | | | | | | | | | |
|  | Tributyl Borate | | | | | | | | | |
| Solvent | Terpineol (b.p. 218° C.) | 100 | 100 | 100 | 100 | 100 | | 100 | 100 | 100 |
|  | Butyl Carbitol (b.p. 230° C.) | | | | | | | | | |
|  | 1-Hexanol (b.p. 156° C.) | | | | | | 100 | | | |
|  | Butyl Acetate (b.p. 125° C.) | | | | | | | | | |
| Inorganic Powder | Glass Powder | 300 | 300 | 300 | 300 | 300 | 300 | 300 | 300 | 300 |
|  | Alumina Powder | | | | | | | | | |
|  | Fluorescent Substance | | | | | | | | | |
|  | Nickel Powder | | | | | | | | | |
|  | Silver Powder | | | | | | | | | |

TABLE 3

|  |  | Examples | | | | | | | | |
|---|---|---|---|---|---|---|---|---|---|---|
|  |  | 1 | 2 | 3 | 4 | 5 | 6 | 7 | 8 | 9 |
| Evaluation Results | Stringiness | | | | | Not Detected | | | | |
|  | 95% Decomposition Temp. (° C.) | 370 | 350 | 400 | 340 | 330 | 330 | 320 | 330 | 330 |
|  | Presence of Blackening | | | | | Not Detected | | | | |
|  | Tack Feeling | | | | | Not Detected | | | | |
|  | Moisture Content (ppm) after 7 Days | 4800 | 3900 | 2500 | 4000 | 4000 | 4200 | 4800 | 5300 | 5000 |
|  | Solvent Content (wt. %) Immediately after pasting | 20 | 20 | 20 | 20 | 20 | 20 | 20 | 20 | 20 |
|  | Solvent Content (wt. %) After 6 Hrs. at 23° C. After Pasting | 19 | 18 | 18 | 19 | 19 | 17 | 19 | 19 | 19 |
|  | State After 6 hrs. at 23° C. After Pasting | | | | | No Skinning | | | | |
|  | 99% Decomposition Temp. (° C.) (TGA Apparatus, Rate of Temp. Elevation 10° C./min.) | 400 | 380 | 420 | 380 | 380 | 360 | 350 | 350 | 360 |
|  | 95% Decomposition Temp. (° C.) (TGA Apparatus, Rate of Temp. Elevation 30° C./min.) | 370 | 360 | 400 | 360 | 350 | 340 | 340 | 350 | 340 |
|  | Viscosity Ratio | 1.8 | 1.9 | 2.4 | 2.2 | 2.1 | 1.9 | 2.7 | 1.8 | 1.9 |

TABLE 4

|  |  | Examples | | | | | | | | |
|---|---|---|---|---|---|---|---|---|---|---|
|  |  | 10 | 11 | 12 | 13 | 14 | 15 | 16 | 17 | 18 |
| Monomer Composition | Methyl Methacrylate | | | | | | | | | |
|  | Isobutyl Methacrylate | 80 | 60 | 80 | 80 | 95 | 95 | 95 | 95 | 95 |
|  | Stearyl Methacrylate | | | | | | | | | |
|  | n-Butyl Methacrylate | | | | | | | | | |
|  | Lauryl Methacrylate | | | | | | | | | |
|  | Glycerol Methacrylate | | | | | | | | | |
|  | Hydroxyethyl Methacrylate | | | | | | | | | |
|  | 3-Methacryloyloxypropyl Trimethoxy Silane | | | | | | | | | |
|  | Polypropylene Glycol Monomethacrylate, Trade Name "BLENMER PP-1000", Polymerization Degree 16, Supplied by NOF Corporation | | | | | 5 | 5 | 5 | 5 | 5 |
|  | Polypropylene Glycol Monomethacrylate, Trade Name "BLENMER PP-500", Polymerization Degree 9, Supplied by NOF Corporation | | | | | | | | | |
|  | Polypropylene Glycol Monomethacrylate, Trade Name "BLENMER PP-800", Polymerization Degree 13, Supplied by NOF Corporation | | | | | | | | | |
|  | Monomethacrylate Modified Substance of Polypropylene Glycol-Polytetramethylene Glycol Copolymer, Trade Name "BLENMER-70PPT-800", Supplied by NOF Corporation | 20 | 40 | | | | | | | |
|  | Monomethacrylate Modified Substance of Polypropylene Glycol/Poly-1,2-Oxybutylene Copolymer, Trade Name "BLENMER-10PPB-500B", Polymerization Degree of Poly-1,2-Oxybutylene: 6, Supplied by NOF Corporation | | | 20 | | | | | | |
|  | Polyethylene Glycol Monomethacrylate, Trade Name "BLENMER-PE-350", Polymerization Degree: 8, Supplied by NOF Corporation | | | | | | | | | |
|  | Tripropylene Glycol Monomethacrylate (Synthesis Example 2) | | | | | 20 | | | | |
|  | Polypropylene Glycol Monomethacrylate (Synthesis Example 3), Polymerization Degree: 7, Number Average Molecular Weight: 400 | | | | | | | | | |
| Chain Transfer Agent | Lauryl Mercaptan | 1 | 1 | 1 | 1 | 1 | 1 | 1 | 1 | 1 |
| Polymerization Solvent | Ethyl Acetate | 100 | 100 | 100 | 100 | 100 | 100 | 100 | 100 | 100 |
|  | Number Average Molecular Weight (Mn) (×10,000) | 3.5 | 3 | 3.6 | 3.6 | 18 | 3.5 | 3.5 | 3.5 | 3.4 |

TABLE 5

|  |  | Examples | | | | | | | | |
|---|---|---|---|---|---|---|---|---|---|---|
|  |  | 10 | 11 | 12 | 13 | 14 | 15 | 16 | 17 | 18 |
| Additive | Polypropylene Glycol (Number Average Molecular Weight 3000), Trade Name "EXCENOL 3020", Supplied by Asahi Glass Co., Ltd. |  |  |  |  |  |  | 30 |  |  |
|  | Polypropylene Glycol (Number Average Molecular Weight 10000), Trade Name "PREMINOL 4011", Supplied by Asahi Glass Co., Ltd. |  |  |  |  |  |  |  | 30 |  |
|  | Polytetramethylene Glycol (Number Average Molecular Weight 1000), Trade Name "PTMG 1000", Supplied by Mitsubishi Chemical Corporation. |  |  |  |  |  |  |  |  | 30 |
|  | 2-Ethylhexyl Acrylate Oligomer (Number Average Molecular Weight 5000), Synthesis Example 1 |  |  |  |  |  |  |  |  |  |
|  | Ethyl Cellulose |  |  |  |  |  |  |  |  |  |
| Decomposition Accelerator | Cumen Hydroxy Peroxide |  |  |  |  |  |  |  |  |  |
|  | t-Butanol Peroxide |  |  |  |  |  |  |  |  |  |
|  | Azobis Isobutyronitrile |  |  |  |  |  |  |  |  |  |
|  | Lead Oxide |  |  |  |  |  |  |  |  |  |
|  | Dodecyl Mercaptan |  |  |  |  |  |  |  |  |  |
|  | 1,6-Hexane Methylene Diamine |  |  |  |  |  |  |  |  |  |
|  | Dibutyl Lead Laurate |  |  |  |  |  |  |  |  |  |
|  | Tributyl Borate |  |  |  |  |  |  |  |  |  |
| Solvent | Terpineol (b.p. 218° C.) | 100 | 100 | 100 | 100 | 100 |  | 100 | 100 | 100 |
|  | Butyl Carbitol (b.p. 230° C.) |  |  |  |  |  | 100 |  |  |  |
|  | 1-Hexanol (b.p. 156° C.) |  |  |  |  |  |  |  |  |  |
|  | Butyl Acetate (b.p. 125° C.) |  |  |  |  |  |  |  |  |  |
| Inorganic Powder | Glass Powder | 300 | 300 | 300 | 300 | 300 | 300 | 300 | 300 | 300 |
|  | Alumina Powder |  |  |  |  |  |  |  |  |  |
|  | Fluorescent Substance |  |  |  |  |  |  |  |  |  |
|  | Nickel Powder |  |  |  |  |  |  |  |  |  |
|  | Silver Powder |  |  |  |  |  |  |  |  |  |

TABLE 6

|  |  | Examples | | | | | | | | |
|---|---|---|---|---|---|---|---|---|---|---|
|  |  | 10 | 11 | 12 | 13 | 14 | 15 | 16 | 17 | 18 |
| Evaluation Results | Stringiness | Not Detected | | | | | | | | |
|  | 95% Decomposition Temp. (° C.) | 330 | 310 | 320 | 320 | 350 | 350 | 350 | 350 | 330 |
|  | Presence of Blackening | Not Detected | | | | | | | | |
|  | Tack Feeling | Not Detected | | | | | | | | |
|  | Moisture Content (ppm) After 7 days | 3500 | 5100 | 4600 | 4800 | 4000 | 4800 | 5100 | 5500 | 5300 |
|  | Solvent Content (wt. %) Immediately After Pasting | 20 | 20 | 20 | 20 | 20 | 20 | 19 | 19 | 19 |
|  | Solvent Content (wt. %) After 6 hrs. at 23° C. After Pasting | 18 | 18 | 19 | 18 | 19 | 19 | 18 | 18 | 17 |
|  | State After 6 hrs. at 23° C. After Pasting | No Skinning | | | | | | | | |
|  | 99% Decomposition Temp. (° C.) (TGA Apparatus, Rate of Temp. Elevation 10° C./min.) | 350 | 340 | 350 | 360 | 370 | 370 | 390 | 380 | 370 |
|  | 95% Decomposition Temp. (° C.) (TGA Apparatus, Rate of Temp. Elevation 30° C./min.) | 340 | 330 | 330 | 340 | 360 | 360 | 370 | 360 | 350 |
|  | Viscosity Ratio | 2.3 | 2.6 | 2.4 | 2 | 1.7 | 2 | 2.4 | 2.6 | 2.7 |

TABLE 7

|  |  | Examples | | | | | | | | | |
|---|---|---|---|---|---|---|---|---|---|---|---|
|  |  | 19 | 20 | 21 | 22 | 23 | 24 | 25 | 26 | 27 | 28 |
| Monomer Composition | Methyl Methacrylate |  |  |  |  |  |  |  |  |  | 30 |
|  | Isobutyl Methacrylate | 95 | 80 | 80 | 80 | 80 | 80 | 80 | 80 | 80 | 60 |
|  | Stearyl Methacrylate |  |  |  |  |  |  |  |  |  |  |
|  | n-Butyl Methacrylate |  |  |  |  |  |  |  |  |  |  |
|  | Lauryl Methacrylate |  |  |  |  |  |  |  |  |  |  |
|  | Glycerol Methacrylate |  |  |  |  |  |  |  |  |  | 5 |
|  | Hydroxyethyl Methacrylate |  |  |  |  |  |  |  |  |  |  |
|  | 3-Methacryloyloxypropyl Trimethoxy Silane |  |  |  |  |  |  |  |  |  |  |
|  | Polypropylene Glycol Monomethacrylate, Trade Name "BLENMER PP-1000", Polymerization Degree 16, Supplied by NOF Corporation | 5 | 20 | 20 | 20 | 20 | 20 | 20 | 20 | 20 | 5 |

TABLE 7-continued

|  |  | Examples | | | | | | | | | |
|---|---|---|---|---|---|---|---|---|---|---|---|
|  |  | 19 | 20 | 21 | 22 | 23 | 24 | 25 | 26 | 27 | 28 |
|  | Polypropylene Glycol Monomethacrylate, Trade Name "BLENMER PP-500", Polymerization Degree 9, Supplied by NOF Corporation | | | | | | | | | | |
|  | Polypropylene Glycol Monomethacrylate, Trade Name "BLENMER PP-800", Polymerization Degree 13, Supplied by NOF Corporation | | | | | | | | | | |
|  | Monomethacrylate Modified Substance of Polypropylene Glycol-Polytetramethylene Glycol Copolymer, Trade Name "BLENMER-70PPT-800", Supplied by NOF Corporation | | | | | | | | | | |
|  | Monomethacrylate Modified Substance of Polypropylene Glycol/Poly-1,2-Oxybutylene Copolymer, Trade Name "BLENMER-10PPB-500B", Polymerization Degree of Poly-1,2-Oxybutylene: 6, Supplied by NOF Corporation | | | | | | | | | | |
|  | Polyethylene Glycol Monomethacrylate, Trade Name "BLENMER-PE-350", Polymerization Degree: 8, Supplied by NOF Corporation | | | | | | | | | | |
|  | Tripropylene Glycol Monomethacrylate (Synthesis Example 2) | | | | | | | | | | |
|  | Polypropylene Glycol Monomethacrylate (Synthesis Example 3), Polymerization Degree: 7, Number Average Molecular Weight: 400 | | | | | | | | | | |
| Chain Transfer Agent | Lauryl Mercaptan | 1 | 1 | 1 | 1 | 1 | 1 | 1 | 1 | 1 | 1 |
| Polymerization Solvent | Ethyl Acetate | 100 | 100 | 100 | 100 | 100 | 100 | 100 | 100 | 100 | 100 |
|  | Number Average Molecular Weight (Mn) (×10,000) | 3.4 | 3.4 | 3.4 | 3.4 | 3.4 | 3.4 | 3.4 | 3.4 | 3.4 | 4.5 |

TABLE 8

|  |  | Examples | | | | | | | | | |
|---|---|---|---|---|---|---|---|---|---|---|---|
|  |  | 19 | 20 | 21 | 22 | 23 | 24 | 25 | 26 | 27 | 28 |
| Additive | Polypropylene Glycol (Number Average Molecular Weight 3000), Trade Name "EXCENOL 3020", Supplied by Asahi Glass Co., Ltd. | | | | | | | | | | |
|  | Polypropylene Glycol (Number Average Molecular Weight 10000), Trade Name "PREMINOL 4011", Supplied by Asahi Glass Co., Ltd. | | | | | | | | | | |
|  | Polytetramethylene Glycol (Number Average Molecular Weight 1000), Trade Name "PTMG 1000", Supplied by Mitsubishi Chemical Corporation. | | | | | | | | | | |
|  | 2-Ethylhexyl Acrylate Oligomer (Number Average Molecular Weight 5000), Synthesis Example 1 | 30 | | | | | | | | | |
|  | Ethyl Cellulose | | | | | | | | | | |
| Decomposition Accelerator | Cumen Hydroxy Peroxide | | 2 | | | | | | | | |
|  | t-Butanol Peroxide | | | 3 | | | | | | | |
|  | Azobis Isobutyronitrile | | | | 2 | | | | | | |
|  | Lead Oxide | | | | | 4 | | | | | |
|  | Dodecyl Mercaptan | | | | | | 3 | | | | |
|  | 1,6-Hexane Methylene Diamine | | | | | | | 2 | | | |
|  | Dibutyl Lead Laurate | | | | | | | | 3 | | |
|  | Tributyl Borate | | | | | | | | | 3 | |
| Solvent | Terpineol (b.p. 218° C.) | 100 | 100 | 100 | 100 | 100 | 100 | 100 | 100 | 100 | 100 |
|  | Butyl Carbitol (b.p. 230° C.) | | | | | | | | | | |
|  | 1-Hexanol (b.p. 156° C.) | | | | | | | | | | |
|  | Butyl Acetate (b.p. 125° C.) | | | | | | | | | | |
| Inorganic Powder | Glass Powder | 300 | 300 | 300 | 300 | 300 | 300 | 300 | 300 | 300 | 300 |
|  | Alumina Powder | | | | | | | | | | |
|  | Fluorescent Substance | | | | | | | | | | |
|  | Nickel Powder | | | | | | | | | | |
|  | Silver Powder | | | | | | | | | | |

TABLE 9

| | | Examples | | | | | | | | | |
|---|---|---|---|---|---|---|---|---|---|---|---|
| | | 19 | 20 | 21 | 22 | 23 | 24 | 25 | 26 | 27 | 28 |
| Evaluation Results | Stringiness | | | | | Not Detected | | | | | |
| | 95% Decomposition Temp. (° C.) | 330 | 310 | 300 | 330 | 320 | 320 | 330 | 330 | 330 | 380 |
| | Presence of Blackening | | | | | Not Detected | | | | | |
| | Tack Feeling | | | | | Not Detected | | | | | |
| | Moisture Content (ppm) After 7 days | 5400 | 4100 | 3800 | 3800 | 4200 | 4000 | 4000 | 4200 | 4100 | 5200 |
| | Solvent Content (wt. %) Immediately After Pasting | 19 | 20 | 20 | 20 | 20 | 20 | 20 | 20 | 20 | 20 |
| | Solvent Content (wt. %) After 6 hrs. at 23° C. After Pasting | 17 | 18 | 18 | 18 | 18 | 19 | 19 | 19 | 18 | 18 |
| | State After 6 hrs. at 23° C. After Pasting | | | | | No Skinning | | | | | |
| | 99% Decomposition Temp. (° C.) (TGA Apparatus, Rate of Temp. Elevation 10° C./min.) | 370 | 330 | 330 | 350 | 350 | 360 | 360 | 350 | 350 | 400 |
| | 95% Decomposition Temp. (° C.) (TGA Apparatus, Rate of Temp. Elevation 30° C./min.) | 350 | 330 | 330 | 340 | 330 | 340 | 340 | 340 | 330 | 380 |
| | Viscosity Ratio | 2.4 | 1.8 | 1.9 | 2 | 2 | 1.8 | 2.1 | 2 | 2 | 3.5 |

TABLE 10

| | | Examples | | | | | | | | | |
|---|---|---|---|---|---|---|---|---|---|---|---|
| | | 29 | 30 | 31 | 32 | 33 | 34 | 35 | 36 | 37 | 38 |
| Monomer Composition | Methyl Methacrylate | 30 | 30 | 30 | 30 | 30 | 30 | | | | |
| | Isobutyl Methacrylate | 60 | 60 | 60 | 60 | 60 | 60 | 55 | 90 | 90 | 90 |
| | Stearyl Methacrylate | | | | | | | | | | |
| | n-Butyl Methacrylate | | | | | | | | | | |
| | Lauryl Methacrylate | | | | | | | 45 | | | |
| | Glycerol Methacrylate | 5 | 5 | 5 | 5 | 5 | | 5 | | | |
| | Hydroxyethyl Methacrylate | | | | | | 5 | | | | |
| | 3-Methacryloyloxypropyl Trimethoxy Silane | | | | | | | | | | |
| | Polypropylene Glycol Monomethacrylate, Trade Name "BLENMER PP-1000", Polymerization Degree 16, Supplied by NOF Corporation | 5 | 5 | 5 | 5 | 5 | 5 | 5 | 10 | 10 | 10 |
| | Polypropylene Glycol Monomethacrylate, Trade Name "BLENMER PP-500", Polymerization Degree 9, Supplied by NOF Corporation | | | | | | | | | | |
| | Polypropylene Glycol Monomethacrylate, Trade Name "BLENMER PP-800", Polymerization Degree 13, Supplied by NOF Corporation | | | | | | | | | | |
| | Monomethacrylate Modified Substance of Polypropylene Glycol-Polytetramethylene Glycol Copolymer, Trade Name "BLENMER-70PPT-800", Supplied by NOF Corporation | | | | | | | | | | |
| | Monomethacrylate Modified Substance of Polypropylene Glycol/Poly-1,2-Oxybutylene Copolymer, Trade Name "BLENMER-10PPB-500B", Polymerization Degree of Poly-1,2-Oxybutylene: 6, Supplied by NOF Corporation | | | | | | | | | | |
| | Polyethylene Glycol Monomethacrylate, Trade Name "BLENMER-PE-350", Polymerization Degree: 8, Supplied by NOF Corporation | | | | | | | | | | |
| | Tripropylene Glycol Monomethacrylate (Synthesis Example 2) | | | | | | | | | | |
| | Polypropylene Glycol Monomethacrylate (Synthesis Example 3), Polymerization Degree: 7, Number Average Molecular Weight: 400 | | | | | | | | | | |
| Chain Transfer Agent | Lauryl Mercaptan | 1 | 1 | 1 | 1 | 1 | 1 | 1 | 0.4 | 0.4 | 0.4 |
| Polymerization Solvent | Ethyl Acetate | 100 | 100 | 100 | 100 | 100 | 100 | 100 | 100 | 100 | 100 |
| | Number Average Molecular Weight (Mn) (×10,000) | 4.5 | 4.5 | 4.5 | 4.5 | 4.5 | 4.5 | 4 | 9.1 | 9.1 | 9.1 |

TABLE 11

|  |  | Examples | | | | | | | | | |
|---|---|---|---|---|---|---|---|---|---|---|---|
|  |  | 29 | 30 | 31 | 32 | 33 | 34 | 35 | 36 | 37 | 38 |
| Additive | Polypropylene Glycol (Number Average Molecular Weight 10000), Trade Name "PREMINOL 4011", Supplied by Asahi Glass Co., Ltd. | | | | | | | | | | |
|  | Polytetramethylene Glycol (Number Average Molecular Weight 1000), Trade Name "PTMG 1000", Supplied by Mitsubishi Chemical Corporation. | | | | | | | | | | |
|  | 2-Ethylhexyl Acrylate Oligomer (Number Average Molecular Weight 5000), Synthesis Example 1 | | | | | | | | | | |
|  | Ethyl Cellulose | | | | | | | | | | |
| Decomposition Accelerator | Cumen Hydroxy Peroxide | | | | | | | | | | |
|  | t-Butanol Peroxide | | | | | | | | | | |
|  | Azobis Isobutyronitrile | | | | | | | | | | |
|  | Lead Oxide | | | | | | | | | | |
|  | Dodecyl Mercaptan | | | | | | | | | | |
|  | 1,6-Hexane Methylene Diamine | | | | | | | | | | |
|  | Dibutyl Lead Laurate | | | | | | | | | | |
|  | Tributyl Borate | | | | | | | | | | |
| Solvent | Terpineol (b.p. 218° C.) | 100 | 100 | 100 | 100 | 100 | 100 | 100 | 100 | 100 | 100 |
|  | Butyl Carbitol (b.p. 230° C.) | | | | | | | | | | |
|  | 1-Hexanol (b.p. 156° C.) | | | | | | | | | | |
|  | Butyl Acetate (b.p. 125° C.) | | | | | | | | | | |
| Inorganic Powder | Glass Powder | 300 | | | | | 300 | 300 | 300 | | |
|  | Alumina Powder | | 300 | | | | | | | 300 | |
|  | Fluorescent Substance | | | 300 | | | | | | | 300 |
|  | Nickel Powder | | | | 300 | | | | | | |
|  | Silver Powder | | | | | 300 | | | | | |

TABLE 12

|  |  | Examples | | | | | | | | | |
|---|---|---|---|---|---|---|---|---|---|---|---|
|  |  | 29 | 30 | 31 | 32 | 33 | 34 | 35 | 36 | 37 | 38 |
| Evaluation Results | Stringiness | | | | | | Not Detected | | | | |
|  | 95% Decomposition Temp. (° C.) | 380 | 380 | 380 | 380 | 380 | 400 | 380 | 370 | 370 | 360 |
|  | Presence of Blackening | | | | | | Not Detected | | | | |
|  | Tack Feeling | | | | | | Not Detected | | | | |
|  | Moisture Content (ppm) After 7 days | 5400 | 5400 | 5300 | 5200 | 5300 | 5000 | 3100 | 4400 | 4500 | 4300 |
|  | Solvent Content (wt. %) Immediately After Pasting | 20 | 20 | 20 | 20 | 20 | 20 | 20 | 20 | 20 | 20 |
|  | Solvent Content (wt. %) After 6 hrs. at 23° C. After Pasting | 19 | 19 | 19 | 19 | 18 | 18 | 19 | 19 | 19 | 18 |
|  | State After 6 hrs. at 23° C. After Pasting | | | | | | No Skinning | | | | |
|  | 99% Decomposition Temp. (° C.) (TGA Apparatus, Rate of Temp. Elevation 10° C./min.) | 390 | 400 | 400 | 390 | 400 | 400 | 390 | 390 | 400 | 390 |
|  | 95% Decomposition Temp. (° C.) (TGA Apparatus, Rate of Temp. Elevation 30° C./min.) | 380 | 380 | 390 | 380 | 380 | 400 | 380 | 380 | 380 | 370 |
|  | Viscosity Ratio | 3.4 | 3 | 3.1 | 3.1 | 3.1 | 2.8 | 3.4 | 1.8 | 2.3 | 2.2 |

TABLE 13

|  |  | Examples | | | | | | | |
|---|---|---|---|---|---|---|---|---|---|
|  |  | 39 | 40 | 41 | 42 | 43 | 44 | 45 | 46 |
| Monomer Composition | Methyl Methacrylate | | | | | | | | |
|  | Isobutyl Methacrylate | 90 | 90 | 95 | 95 | 95 | 95 | 95 | |
|  | Stearyl Methacrylate | | | | | | | | |
|  | n-Butyl Methacrylate | | | | | | | | 95 |
|  | Lauryl Methacrylate | | | | | | | | |
|  | Glycerol Methacrylate | | | | | | | | |
|  | Hydroxyethyl Methacrylate | | | | | | | | |
|  | 3-Methacryloyloxypropyl Trimethoxy Silane | | | | | | | | |

TABLE 13-continued

|  |  | Examples | | | | | | | |
|---|---|---|---|---|---|---|---|---|---|
|  |  | 39 | 40 | 41 | 42 | 43 | 44 | 45 | 46 |
|  | Polypropylene Glycol Monomethacrylate, Trade Name "BLENMER PP-1000", Polymerization Degree 16, Supplied by NOF Corporation | 10 | 10 | 5 | 5 | 5 | 5 | 5 | 5 |
|  | Polypropylene Glycol Monomethacrylate, Trade Name "BLENMER PP-500", Polymerization Degree 9, Supplied by NOF Corporation | | | | | | | | |
|  | Polypropylene Glycol Monomethacrylate, Trade Name "BLENMER PP-800", Polymerization Degree 13, Supplied by NOF Corporation | | | | | | | | |
|  | Monomethacrylate Modified Substance of Polypropylene Glycol-Polytetramethylene Glycol Copolymer, Trade Name "BLENMER-70PPT-800", Supplied by NOF Corporation | | | | | | | | |
|  | Monomethacrylate Modified Substance of Polypropylene Glycol/poly-1,2-Oxybutylene Copolymer, Trade Name "BLENMER-10PPB-500B", Polymerization Degree of Poly-1,2-Oxybutylene: 6, Supplied by NOF Corporation | | | | | | | | |
|  | Polyethylene Glycol Monomethacrylate, Trade Name "BLENMER-PE-350", Polymerization Degree: 8, Supplied by NOF Corporation | | | | | | | | |
|  | Tripropylene Glycol Monomethacrylate (Synthesis Example 2) | | | | | | | | |
|  | Polypropylene Glycol Monomethacrylate (Synthesis Example 3), Polymerization Degree: 7, Number Average Molecular Weight: 400 | | | | | | | | |
| Chain Transfer Agent | Lauryl Mercaptan | 0.4 | 0.4 | 1 | 1 | 1 | 1 | 1 | 1 |
| Polymerization Solvent | Ethyl Acetate | 100 | 100 | 100 | 100 | 100 | 100 | 100 | 100 |
|  | Number Average Molecular Weight (Mn) (×10,000) | 9.1 | 9.1 | 3.6 | 3.6 | 3.6 | 3.6 | 10.7 | 3.2 |

TABLE 14

|  |  | Examples | | | | | | | |
|---|---|---|---|---|---|---|---|---|---|
|  |  | 39 | 40 | 41 | 42 | 43 | 44 | 45 | 46 |
| Additive | Polypropylene Glycol (Number Average Molecular Weight 3000), Trade Name "EXCENOL 3020", Supplied by Asahi Glass Co., Ltd. | | | | | | | | |
|  | Polypropylene Glycol (Number Average Molecular Weight 10000), Trade Name "PREMINOL 4011", Supplied by Asahi Glass Co., Ltd. | | | | | | | | |
|  | Polytetramethylene Glycol (Number Average Molecular Weight 1000), Trade Name "PTMG 1000", Supplied by Mitsubishi Chemical Corporation. | | | | | | | | |
|  | 2-Ethylhexyl Acrylate Oligomer (Number Average Molecular Weight 5000), Synthesis Example 1 | | | | | | | | |
|  | Ethyl Cellulose | | | | | | | | |
| Decomposition Accelerator | Cumen Hydroxy Peroxide | | | | | | | | |
|  | t-Butanol Peroxide | | | | | | | | |
|  | Azobis Isobutyronitrile | | | | | | | | |
|  | Lead Oxide | | | | | | | | |
|  | Dodecyl Mercaptan | | | | | | | | |
|  | 1,6-Hexane Methylene Diamine | | | | | | | | |
|  | Dibutyl Lead Laurate | | | | | | | | |
|  | Tributyl Borate | | | | | | | | |
| Solvent | Terpineol (b.p. 218° C.) | 100 | 100 | 100 | 100 | 100 | 100 | 100 | 100 |
|  | Butyl Carbitol (b.p. 230° C.) | | | | | | | | |
|  | 1-Hexanol (b.p. 156° C.) | | | | | | | | |
|  | Butyl Acetate (b.p. 125° C.) | | | | | | | | |
| Inorganic Powder | Glass Powder | | | | | | | 300 | 300 |
|  | Alumina Powder | | | 300 | | | | | |
|  | Fluorescent Substance | | | | 300 | | | | |
|  | Nickel Powder | 300 | | | | 300 | | | |
|  | Silver Powder | | 300 | | | | 300 | | |

TABLE 15

| | | Examples | | | | | | | |
|---|---|---|---|---|---|---|---|---|---|
| | | 39 | 40 | 41 | 42 | 43 | 44 | 45 | 46 |
| Evaluation Results | Stringiness | | | | Not Detected | | | | |
| | 95% Decomposition Temp. (° C.) | 370 | 370 | 350 | 360 | 350 | 350 | 300 | 400 |
| | Presence of Blackening | | | | Not Detected | | | | |
| | Tack Feeling | | | | Not Detected | | | | Slightly Detected |
| | Moisture Content (ppm) After 7 days | 4800 | 4700 | 4600 | 4200 | 4400 | 4500 | 4300 | 4700 |
| | Solvent Content (wt. %) Immediately After Pasting | 20 | 20 | 20 | 20 | 20 | 20 | 20 | 20 |
| | Solvent Content (wt. %) After 6 hrs. at 23° C. After Pasting | 19 | 18 | 18 | 19 | 18 | 18 | 18 | 18 |
| | State After 6 hrs. at 23° C. After Pasting | | | | No Skinning | | | | |
| | 99% Decomposition Temp. (° C.) (TGA Apparatus, Rate of Temp. Elevation 10° C./min.) | 380 | 370 | 380 | 380 | 370 | 390 | 340 | 400 |
| | 95% Decomposition Temp. (° C.) (TGA Apparatus, Rate of Temp. Elevation 30° C./min.) | 370 | 370 | 370 | 360 | 360 | 360 | 320 | 400 |
| | Viscosity Ratio | 2.1 | 2.4 | 2.1 | 1.8 | 1.9 | 2 | 1.7 | 1.8 |

TABLE 16

| | | Examples | | | | | | | | |
|---|---|---|---|---|---|---|---|---|---|---|
| | | 47 | 48 | 49 | 50 | 51 | 52 | 53 | 54 | 55 |
| Monomer Composition | Methyl Methacrylate | | | | | | | | | |
| | Isobutyl Methacrylate | 92 | 92 | 92 | 92 | 92 | 92 | 92 | 92 | 95 |
| | Stearyl Methacrylate | | | | | | | | | |
| | n-butyl Methacrylate | | | | | | | | | |
| | Lauryl Methacrylate | | | | | | | | | |
| | Glycerol Methacrylate | | | | | | | | | |
| | Hydroxyethyl Methacrylate | | | | | | | | | |
| | 3-Methacryloyloxypropyl Trimethoxy Silane | 3 | 3 | 3 | 3 | 3 | 3 | 3 | 3 | |
| | Polypropylene Glycol Monomethacrylate, Trade Name "BLENMER PP-1000", Polymerization Degree 16, Supplied by NOF Corporation | 5 | 5 | 5 | 5 | 5 | 5 | 5 | 5 | 5 |
| | Polypropylene Glycol Monomethacrylate, Trade Name "BLENMER PP-500", Polymerization Degree 9, Supplied by NOF Corporation | | | | | | | | | |
| | Polypropylene Glycol Monomethacrylate, Trade Name "BLENMER PP-800", Polymerization Degree 13, Supplied by NOF Corporation | | | | | | | | | |
| | Monomethacrylate Modified Substance of Polypropylene Glycol-Polytetramethylene Glycol Copolymer, Trade Name "BLENMER-70PPT-800", Supplied by NOF Corporation | | | | | | | | | |
| | Monomethacrylate Modified Substance of Polypropylene Glycol/poly-1,2-Oxybutylene Copolymer, Trade Name "BLENMER-10PPB-500B", Polymerization Degree of Poly-1,2-Oxybutylene: 6, Supplied by NOF Corporation | | | | | | | | | |
| | Polyethylene Glycol Monomethacrylate, Trade Name "BLENMER-PE-350", Polymerization Degree: 8, Supplied by NOF Corporation | | | | | | | | | |
| | Tripropylene Glycol Monomethacrylate (Synthesis Example 2) | | | | | | | | | |
| | Polypropylene Glycol monomethacrylate (Synthesis Example 3), Polymerization Degree: 7, Number Average Molecular Weight: 400 | | | | | | | | | |
| Chain Transfer Agent | Lauryl Mercaptan | 3 | 3 | 3 | 3 | 3 | 3 | 3 | 3 | |
| Polymerization Solvent | Ethyl Acetate | | | | | | | | | |
| | Number Average Molecular Weight (Mn) (×10,000) | 0.6 | 0.6 | 0.6 | 0.6 | 0.6 | 0.6 | 0.6 | 0.6 | |

TABLE 17

| | | Examples | | | | | | | | |
|---|---|---|---|---|---|---|---|---|---|---|
| | | 47 | 48 | 49 | 50 | 51 | 52 | 53 | 54 | 55 |
| Additive | Polypropylene Glycol (Number Average Molecular Weight 3000), Trade Name "EXCENOL 3020", Supplied by Asahi Glass Co., Ltd. | | | | | | | | | |
| | Polypropylene Glycol (Number Average Molecular Weight 10000), Trade Name "PREMINOL 4011", Supplied by Asahi Glass Co., Ltd. | | | | | | | | | |
| | Polytetramethylene Glycol (Number Average Molecular Weight 1000), Trade Name "PTMG 1000", Supplied by Mitsubishi Chemical Corporation. | | | | | | | | | |
| | 2-Ethylhexyl Acrylate Oligomer (Number Average Molecular Weight 5000), Synthesis Example 1 | | | | | | | | | |
| | Ethyl Cellulose | | | | | | | | | |
| Decomposition Accelerator | Cumen Hydroxy Peroxide | | | 2 | | | | | | |
| | t-Butanol Peroxide | | | | | | | | | |
| | Azobis Isobutyronitrile | | | | | 2 | | | | |
| | Lead Oxide | | | | | | 4 | | | |
| | Dodecyl Mercaptan | | | | | | | 3 | | |
| | 1,6-Hexane Methylene Diamine | | | | | | | | 2 | |
| | Dibutyl Lead Laurate | | | | | | | | 3 | |
| | Tributyl Borate | | | | | | | | | 3 |
| Solvent | Terpineol (b.p. 218° C.) | | | | | | | | | |
| | Butyl Carbitol (b.p. 230° C.) | | | | | | | | | |
| | 1-Hexanol (b.p. 156° C.) | | | | | | | | | |
| | Butyl Acetate (b.p. 125° C.) | | | | | | | | | |
| Inorganic Powder | Glass Powder | | | | | | | | | |
| | Alumina Powder | | | | | | | | | |
| | Fluorescent Substance | | | | | | | | | |
| | Nickel Powder | | | | | | | | | |
| | Silver Powder | | | | | | | | | |

TABLE 18

| | | Examples | | | | | | | | |
|---|---|---|---|---|---|---|---|---|---|---|
| | | 47 | 48 | 49 | 50 | 51 | 52 | 53 | 54 | 55 |
| Evaluation Results | Stringiness | | | | | | | | | |
| | 95% Decomposition Temp. (° C.) | | | | | | | | | 300 |
| | Presence of Blackening | | | | | | | | | |
| | Tack Feeling | | | | | | | | | |
| | Moisture Content (ppm) After 7 days | | | | | | | | | |
| | Solvent Content (wt. %) Immediately After Pasting | | | | | | | | | |
| | Solvent Content (wt. %) After 6 hrs. at 23° C. After Pasting | | | | | | | | | |
| | State After 6 hrs. at 23° C. After Pasting | | | | | | | | | |
| | 99% Decomposition Temp. (° C.) (TGA Apparatus, Rate of Temp. Elevation 10° C./min.) | | | | | | | | | |
| | 95% Decomposition Temp. (° C.) (TGA Apparatus, Rate of Temp. Elevation 30° C./min.) | | | | | | | | | |
| | Viscosity Ratio | | | | | | | | | |

TABLE 19

| | | Comparative Examples | | | | | | |
|---|---|---|---|---|---|---|---|---|
| | | 1 | 2 | 3 | 4 | 5 | 6 | 7 |
| Monomer Composition | Methyl Methacrylate | | | | | | | 80 |
| | Isobutyl Methacrylate | | 95 | 100 | | 100 | 80 | 80 |
| | Stearyl Methacrylate | | | | | | | |
| | n-butyl Methacrylate | | | | | | | |
| | Lauryl Methacrylate | | | | | | | |
| | Glycerol Methacrylate | | | | | | | |
| | Hydroxyethyl Methacrylate | | | | | | | |
| | 3-Methacryloyloxypropyl Trimethoxy Silane | | | | | | | |

TABLE 19-continued

| | | Comparative Examples | | | | | | |
|---|---|---|---|---|---|---|---|---|
| | | 1 | 2 | 3 | 4 | 5 | 6 | 7 |
| | Polypropylene Glycol Monomethacrylate, Trade Name "BLENMER PP-1000", Polymerization Degree 16, Supplied by NOF Corporation | 5 | 0.5 | | | | | 20 |
| | Polypropylene Glycol Monomethacrylate, tTade Name "BLENMER PP-500", Polymerization Degree 9, Supplied by NOF Corporation | | | | | | | |
| | Polypropylene Glycol Monomethacrylate, Trade Name "BLENMER PP-800", Polymerization Degree 13, Supplied by NOF Corporation | | | | | | | |
| | Monomethacrylate Modified Substance of Polypropylene Glycol-Polytetramethylene Glycol Copolymer, Trade Name "BLENMER-70PPT-800", Supplied by NOF Corporation | | | | | | | |
| | Monomethacrylate Modified Substance of Polypropylene Glycol/Poly-1,2-Oxybutylene Copolymer, Trade Name "BLENMER-10PPB-500B", Polymerization Degree of Poly-1,2-Oxybutylene: 6, Supplied by NOF Corporation | | | | | | | |
| | Polyethylene Glycol Monomethacrylate, Trade Name "BLENMER-PE-350", Polymerization Degree: 8, Supplied by NOF Corporation | | | | | 20 | | |
| | Tripropylene Glycol Monomethacrylate (Synthesis Example 2) | | | | | | 20 | |
| | Polypropylene Glycol monomethacrylate (Synthesis Example 3), Polymerization Degree: 7, Number Average Molecular Weight: 400 | | | | | | | |
| Chain Transfer Agent | Lauryl Mercaptan | 1.2 | 1 | | 1 | 1 | 1 | 1 |
| Polymerization Solvent | Ethyl Acetate | | | | | | | |
| | Number Average Molecular Weight (Mn) (×10,000) | 23 | 3.1 | | 3.1 | 3.5 | 3.5 | 3.5 |

TABLE 20

| | | Comparative Examples | | | | | | |
|---|---|---|---|---|---|---|---|---|
| | | 1 | 2 | 3 | 4 | 5 | 6 | 7 |
| Additive | Polypropylene Glycol (Number Average Molecular Weight 3000), Trade Name "EXCENOL 3020", Supplied by Asahi Glass Co., Ltd. | | | | | | | |
| | Polypropylene Glycol (Number Average Molecular Weight 10000), Trade Name "PREMINOL 4011", Supplied by Asahi Glass Co., Ltd. | | | | | | | |
| | Polytetramethylene Glycol (Number Average Molecular Weight 1000), Trade Name "PTMG 1000", Supplied by Mitsubishi Chemical Corporation. | | | | | | | |
| | 2-Ethylhexyl Acrylate Oligomer (Number Average Molecular Weight 5000), Synthesis Example 1 | | | | | | | |
| | Ethyl Cellulose | | | 10 | | | | |
| Decomposition Accelerator | Cumen Hydroxy Peroxide | | | | | | | |
| | t-Butanol Peroxide | | | | | | | |
| | Azobis Isobutyronitrile | | | | | | | |
| | Lead Oxide | | | | | | | |
| | Dodecyl Mercaptan | | | | | | | |
| | 1,6-Hexane Methylene Diamine | | | | | | | |
| | Dibutyl Lead Laurate | | | | | | | |
| | Tributyl Borate | | | | | | | |
| Solvent | Terpineol (b.p. 218° C.) | 100 | | 90 | 100 | 100 | 100 | |
| | Butyl Carbitol (b.p. 230° C.) | | | | | | | |
| | 1-Hexanol (b.p. 156° C.) | | | | | | | |
| | Butyl Acetate (b.p. 125° C.) | | | | | | | 100 |
| Inorganic Powder | Glass Powder | 300 | 300 | 300 | 300 | 300 | 300 | 300 |
| | Alumina Powder | | | | | | | |
| | Fluorescent Substance | | | | | | | |
| | Nickel Powder | | | | | | | |
| | Silver Powder | | | | | | | |

TABLE 21

|  |  | Comparative Examples | | | | | | |
|---|---|---|---|---|---|---|---|---|
|  |  | 1 | 2 | 3 | 4 | 5 | 6 | 7 |
| Evaluation Results | Stringiness | Detected | Not Detected | | | Detected | | |
|  | 95% Decomposition Temp. (° C.) | 350 | 400 | 450 | 410 | 430 | 410 | 330 |
|  | Presence of Blackening | Not Detected | Detected | | Not Detected | Detected | | Not Detected |
|  | Tack Feeling | | | | Not Detected | | | |
|  | Moisture Content (ppm) After 7 Days | 4100 | 4200 | 4300 | 4100 | 25000 | 4300 | 3700 |
|  | Solvent Content (wt. %) Immediately After Pasting | 20 | 20 | 23 | 20 | 20 | 20 | 20 |
|  | Solvent Content (wt. %) After 6 hrs. at 23° C. After Pasting | 19 | 18 | 22 | 18 | 19 | 19 | 13 |
|  | State After 6 hrs. at 23° C. After Pasting | | | | No Skinning | | | Skinning |
|  | 99% Decomposition Temp. (° C.) (TGA Apparatus, Rate of Temp. Elevation 10° C./min.) | 420 | 450 | 580 | 460 | 470 | 450 | 380 |
|  | 95% Decomposition Temp. (° C.) (TGA Apparatus, Rate of Temp. Elevation 30° C./min.) | 400 | 430 | 470 | 440 | 460 | 440 | 350 |
|  | Viscosity Ratio | 1.4 | 1.2 | 2.8 | 1.1 | 1.4 | 1.3 | 1.1 |

TABLE 22

|  |  | Examples | | | | | Comparative Examples | | | |
|---|---|---|---|---|---|---|---|---|---|---|
|  |  | 56 | 57 | 58 | 59 | 60 | 9 | 10 | 11 | 12 |
| Monomer Composition | Isobutyl Methacrylate | 84 | 75 | 55 | 75 | 75 | 85 | 84.5 | 50 | 35 |
|  | 2-Ethylhexyl Methacrylate | | | | | 10 | | | | |
|  | Stearyl Acrylate | 1 | 10 | 30 | | | | 0.5 | 35 | 50 |
|  | Lauryl Methacrylate | | | | 10 | | | | | |
|  | Polypropylene Glycol Methacrylate, Trade Name "BLENMER-PP-1000", Supplied by NOF Corporation | 5 | 5 | 5 | 5 | 5 | 5 | 5 | 5 | 5 |
|  | Glycerol Methacrylate, Trade Name "BLENMER-GLM" | 10 | 10 | 10 | 10 | 10 | 10 | 10 | 10 | 10 |
| Chain Transfer Agent | Dodecyl Mercaptan | 2 | 2 | 2 | 2 | 2 | 2 | 2 | 2 | 2 |
|  | Number Average Molecular Weight (Mn) (×10,000) | 1.8 | 1.8 | 1.5 | 1.8 | 1.6 | 1.8 | 1.8 | 1.8 | 1.8 |
| Additive | Polytetramethylene Glycol | 100 | 100 | 100 | 100 | 100 | 100 | 100 | 100 | 100 |
| Solvent | Terpineol | 100 | 100 | 100 | 100 | 100 | 100 | 100 | 100 | 100 |
|  | Viscosity Ratio | 2 | 2 | 2 | 2 | 2 | 2 | 2 | 1.3 | 1 |
|  | Plate Leaving Property | ◯ | ◯ | ◯ | ◯ | ◯ | X | X | X | X |

TABLE 23

|  |  | Examples | | | | | | | |
|---|---|---|---|---|---|---|---|---|---|
|  |  | 61 | 62 | 63 | 64 | 65 | 66 | 67 | 68 |
| Monomer Composition | Isobutyl Methacrylate | 85 | 85 | 85 | 85 | 85 | 85 | 85 | 85 |
|  | Polypropylene Glycol Methacrylate, Trade Name "BLENMER-PP-1000", Supplied by NOF Corporation | 5 | 5 | 5 | 5 | 5 | 5 | 5 | 5 |
|  | Glycerol Methacrylate, Trade Name "BLENMER-GLM" | 10 | 10 | 10 | 10 | 10 | 10 | 10 | 10 |
|  | Dodecyl Mercaptan | 2 | 2 | 2 | 2 | 2 | 2 | 2 | 2 |
|  | Number Average Molecular Weight (Mn) (×10,000) | 1.8 | 1.8 | 1.8 | 1.8 | 1.8 | 1.8 | 1.8 | 1.8 |
| Additive | Polytetramethylene Glycol | 100 | 100 | 100 | | | | | |
|  | Glycerin | | | | 100 | 100 | 100 | 100 | 100 |
| Solvent | Terpineol | 100 | 100 | 100 | 100 | 100 | 100 | 100 | 100 |
| Additive | Polyoxyethylene Decyl Ether | 0 | 1 | 10 | | | | | |
|  | Polyoxyethylene Lauryl Ether | | | | 4 | 10 | 20 | | |
|  | Polyoxyethylene Oleyl Ether | | | | | | | 10 | |
|  | Polyoxyethylene Isodecyl Ether | | | | | | | | 10 |
|  | Screen Printability (Viscosity Ratio) | 2 | 2 | 2 | 2 | 2 | 2 | 2 | 2 |
|  | Storage Stability | ◯ | ◯ | ◯ | ◯ | ◯ | ◯ | ◯ | ◯ |

TABLE 24

|  |  | Comparative Examples | | | |
|---|---|---|---|---|---|
|  |  | 13 | 14 | 15 | 16 |
| Monomer Composition | Isobutyl Methacrylate | 85 | 85 | 85 | 85 |
|  | Polypropylene Glycol Methacrylate, Trade Name "BLENMER-PP-1000", Supplied by NOF Corporation | 5 | 5 | 5 | 5 |
|  | Glycerol Methacrylate, Trade Name "BLENMER-GLM" | 10 | 10 | 10 | 10 |
|  | Dodecyl Mercaptan | 2 | 2 | 2 | 2 |
|  | Number Average Molecular Weight (Mn) (×10,000) | 1.8 | 1.8 | 1.8 | 1.8 |
| Additive | Polytetramethylene Glycol | 100 | 100 | 100 | 100 |
|  | Glycerin |  |  |  |  |
| Solvent | Terpineol | 100 | 100 | 100 | 100 |
| Additive | Polyoxyethylene Decyl Ether | 0 | 0.005 | 15 | 30 |
|  | Polyoxyethylene Lauryl Ether |  |  |  |  |
|  | Polyoxyethylene Oleyl Ether |  |  |  |  |
|  | Polyoxyethylene Isodecyl Ether |  |  |  |  |
|  | Screen Printability (Viscosity Ratio) | 2 | 2 | 1.5 | 1 |
|  | Storage Stability | X | Δ | Δ | X |

TABLE 25

|  |  | Examples | | | | | | | | |
|---|---|---|---|---|---|---|---|---|---|---|
|  |  | 69 | 70 | 71 | 72 | 73 | 74 | 75 | 76 | 77 |
| Monomer Composition | Isobutyl Methacrylate | 85 | 85 | 85 | 85 | 85 | 85 | 85 | 85 | 85 |
|  | Polypropylene Glycol Methacrylate, Trade Name "BLENMER-PP-1000", Supplied by NOF Corporation | 5 | 5 | 5 | 5 | 5 | 5 | 5 | 5 | 5 |
|  | Glycerol Methacrylate, Trade Name "BLENMER-GLM" | 10 | 10 | 10 | 10 | 10 | 10 | 10 |  |  |
|  | 2-Hydroxyethyl Methacrylate |  |  |  |  |  |  |  | 10 |  |
|  | 1,6-Hexanediol Monomethacrylate |  |  |  |  |  |  |  |  | 10 |
| Chain Transfer Agent | Dodecyl Mercaptan | 2 | 2 | 2 | 2 | 2 | 2 | 2 | 2 | 2 |
|  | Number Average Molecular Weight (Mn) (×10,000) | 1.8 | 1.8 | 1.8 | 1.8 | 1.8 | 1.8 | 1.8 | 1.9 | 1.7 |
| Solvent | Terpineol | 30 | 100 | 30 | 100 | 30 | 100 | 100 | 100 | 100 |
| Additive | Glycerin | 20 | 20 | 100 | 100 | 200 | 200 |  | 100 | 100 |
|  | Polytetramethylene Glycol |  |  |  |  |  |  | 100 |  |  |
| Evaluation Results | Low Temperature Decomposability | ○ | ○ | ○ | ○ | ○ | ○ | ○ | ○ | ○ |
|  | Screen Printability | ○ | ○ | ○ | ○ | ○ | ○ | ○ | ○ | ○ |
|  | Viscosity Ratio | 2 | 2 | 2 | 2 | 2 | 2 | 2 | 2 | 2 |
|  | Presence/Absence of Filiform Dusts | ○ | ○ | ○ | ○ | ○ | ○ | ○ | ○ | ○ |
|  | Solution Stability | ○ | ○ | ○ | ○ | ○ | ○ | ○ | ○ | ○ |
|  | Haze Value | 20 | 20 | 80 | 80 | 95 | 95 | 95 | 70 | 65 |

TABLE 26

|  |  | Comparative Examples | | | | | |
|---|---|---|---|---|---|---|---|
|  |  | 17 | 18 | 19 | 20 | 21 | 22 |
| Monomer Composition | Isobutyl Methacrylate | 85 | 85 | 85 | 85 | 95 | 100 |
|  | Polypropylene Glycol Methacrylate, Trade Name "BLENMER-PP-1000", Supplied by NOF Corporation | 5 | 5 | 5 | 5 | 5 |  |
|  | Glycerol Methacrylate, Trade Name "BLENMER-GLM" | 10 | 10 | 10 | 10 |  |  |
|  | 2-Hydroxyethyl Methacrylate |  |  |  |  |  |  |
|  | 1,6-Hexanediol Monomethacrylate |  |  |  |  |  |  |
| Chain Transfer Agent | Dodecyl Mercaptan | 2 | 2 | 2 | 2 | 2 | 0.5 |
|  | Number Average Molecular Weight (Mn) (×10,000) | 1.8 | 1.8 | 1.8 | 1.8 | 1.8 | 5.8 |
| Solvent | Terpineol | 100 | 100 | 120 | 100 | 100 | 220 |
| Additive | Glycerin | 5 | 220 | 200 |  | 100 |  |
|  | Polytetramethylene Glycol |  |  |  |  |  |  |
| Evaluation Results | Low Temperature Decomposability | ○ | ○ | ○ | ○ | ○ | ○ |
|  | Screen Printability | X | ○ | X | X | X | ○ |
|  | Viscosity Ratio | 1.1 | 2 | 1.4 | 1.1 | 1.1 | 2 |
|  | Presence/Absence of Filiform Dusts | X | ○ | ○ | X | X | X |
|  | Solution Stability | ○ |  | ○ | ○ | X | ○ |
|  | Haze Value | 10 | Not Measurable | 15 | 5 | Not Measurable | 2 |

The invention claimed is:

1. A binder resin composition comprising as a matrix resin, copolymer (A) having a segment derived from (meth)acrylic acid alkyl ester monomer and a polyalkylene oxide segment formed of a repeating unit shown by Chemical formula (1), and an organic compound (D) having three or more hydroxyl groups, $$-(OR)n- \qquad (1)$$

wherein said compound (D) having three or more hydroxyl groups is contained in a ratio of 20-200 parts by weight, relative to 100 parts by weight of copolymer (A).

2. The binder resin composition according to claim 1, comprising at least one polyalkylene oxide segment selected from the group consisting of polypropylene oxide, polymethylethylene oxide, polyethylethyleneoxide, polytrimethylene oxide, and polytetramethylene oxide.

3. The binder resin composition according to claim 1 or 2, wherein the segment derived from (meth)acrylic acid alkyl ester monomer is a segment derived from (meth)acrylic acid alkyl ester monomer having a glass transition temperature of homopolymer of 30° C. or higher.

4. The binder resin composition according to claim 1 or 2, wherein copolymer (A) is copolymer (A1) which contains a segment derived from (meth)acrylic acid alkyl ester monomer having a glass transition temperature of homopolymer of 0° C. or less as a copolymerizing component.

5. The binder resin composition according to claim 1 or 2, wherein in copolymer (A), a copolymerizing monomer having a functional group capable of forming a hydrogen bond with a hydroxyl group is copolymerized.

6. The binder resin composition according to claim 5, wherein the copolymerizing monomer having a functional group capable of forming a hydrogen bond with a hydroxyl group is a hydroxyl group-containing (meth)acrylic acid ester monomer.

7. The binder resin composition according to claim 1, wherein organic compound (D) having three or more hydroxyl groups is a compound which is liquid at room temperature.

8. The binder resin composition according to claim 1, further comprising a nonionic surfactant.

9. The binder resin composition according to claim 7 or 8, wherein a Haze value determined from a total light transmission when a thin film having a thickness of 5 mm is formed is 20 or more.

10. The binder resin composition according to claim 1 or 2, further comprising an organic solvent having a boiling point of 150° C. or higher.

11. The binder resin composition according to claim 1 or 2, further comprising a decomposition accelerator.

12. The binder resin composition according to claim 11, wherein the decomposition accelerator is an organic peroxide.

13. A method of producing a burnt product, comprising the steps of preparing a ceramic green sheet using a ceramic slurry containing ceramic powder and the binder resin composition according to claim 1 or 2, and burning a laminate made up of a stack of a plurality of ceramic green sheets at a temperature of 300° C. or less.

14. A glass paste comprising the binder resin composition according to claim 1 or 2, and glass powder dispersed in the binder resin composition.

15. A ceramic paste comprising the binder resin composition according to claim 1 or 2, and ceramic powder dispersed in the binder resin composition.

16. A phosphor paste comprising the binder resin composition according to claim 1 or 2, and phosphor powder dispersed in the binder resin composition.

17. A conductive paste comprising the binder resin composition according to claim 1 or 2, and conductive powder dispersed in the binder resin composition.

18. A green sheet comprising the binder resin composition according to claim 1 or 2, and glass powder or ceramic powder dispersed in the binder resin composition.

* * * * *